United States Patent
Wenzel et al.

(10) Patent No.: US 8,141,140 B2
(45) Date of Patent: Mar. 20, 2012

(54) METHODS AND SYSTEMS FOR SINGLE SIGN ON WITH DYNAMIC AUTHENTICATION LEVELS

(75) Inventors: Roberto Wenzel, Great Neck, NY (US); Alexander Kalinovsky, New York, NY (US); Justin Michael Billinghay, New York, NY (US); Aditya Kommaraju, Edison, NJ (US); Suresh Madhavan, Edison, NJ (US); Akhilesh Kumar, Rahway, NJ (US); Fred Hoysted, London (GB); Rachel Hoyle, London (GB); Henry Robert Michaluk, New York, NY (US)

(73) Assignee: HSBC Technologies Inc., Jersey City, NJ (US)

( * ) Notice: Subject to any disclaimer, the term of this patent is extended or adjusted under 35 U.S.C. 154(b) by 493 days.

(21) Appl. No.: 12/469,350

(22) Filed: May 20, 2009

(65) Prior Publication Data

US 2009/0292927 A1    Nov. 26, 2009

Related U.S. Application Data

(60) Provisional application No. 61/055,566, filed on May 23, 2008.

(51) Int. Cl.
*H04L 9/32* (2006.01)
*H04L 29/06* (2006.01)
*G06F 15/16* (2006.01)

(52) U.S. Cl. ............... 726/8; 726/27; 713/182
(58) Field of Classification Search .................. None
See application file for complete search history.

(56) References Cited

U.S. PATENT DOCUMENTS

| | | | |
|---|---|---|---|
| 5,237,614 A | 8/1993 | Weiss | |
| 5,848,412 A * | 12/1998 | Rowland et al. | 1/1 |
| 6,088,801 A * | 7/2000 | Grecsek | 726/1 |
| 6,668,322 B1 | 12/2003 | Wood et al. | |
| 7,086,085 B1 * | 8/2006 | Brown et al. | 726/7 |
| 7,213,249 B2 * | 5/2007 | Tung Loo et al. | 719/330 |
| 7,216,163 B2 * | 5/2007 | Sinn | 709/224 |
| 7,490,347 B1 * | 2/2009 | Schneider et al. | 726/2 |
| 7,711,818 B2 * | 5/2010 | Lee et al. | 709/225 |
| 7,941,669 B2 * | 5/2011 | Foley et al. | 713/182 |
| 2002/0073320 A1 | 6/2002 | Rinkevich et al. | |
| 2002/0112052 A1 * | 8/2002 | Brittingham et al. | 709/224 |
| 2003/0105862 A1 * | 6/2003 | Villavicencio | 709/225 |

(Continued)

OTHER PUBLICATIONS

International Preliminary Examination Report from PCT/US2009/044792, mailed Aug. 12, 2010.

(Continued)

*Primary Examiner* — Christopher Revak
(74) *Attorney, Agent, or Firm* — Stroock & Stroock & Lavan LLP

(57) ABSTRACT

Method and systems for single sign on with dynamic authentication levels is described. The method include receiving a data request for access to a second application, where the user is already authenticated to the first application at a first authentication level. Application information about the authentication level necessary to access the second application is retrieved. In response to a request, the user provides the further authentication data for accessing the second application. The type of the further authentication data required is based on the first authentication level and the minimum authentication level necessary to access the second application. The user is then authenticated to the second application at the minimum authentication level necessary to access the second application.

45 Claims, 36 Drawing Sheets

U.S. PATENT DOCUMENTS

| | | |
|---|---|---|
| 2006/0059564 A1 | 3/2006 | Tan et al. |
| 2008/0072301 A1 | 3/2008 | Chia et al. |
| 2010/0122333 A1* | 5/2010 | Noe .................................. 726/8 |
| 2011/0197074 A1* | 8/2011 | Foley et al. .................... 713/186 |
| 2011/0197265 A1* | 8/2011 | Foley et al. ........................ 726/4 |
| 2011/0202978 A1* | 8/2011 | Foley et al. ........................ 726/4 |

OTHER PUBLICATIONS

International Search Report from PCT/US2009/044792, mailed Jul. 14, 2009.

* cited by examiner

METHODS AND SYSTEMS FOR SINGLE SIGN ON WITH DYNAMIC AUTHENTICATION LEVELS

CROSS-REFERENCE TO RELATED APPLICATIONS

This application claims the benefit under 35 U.S.C. 119(e) of U.S. Provisional Patent Application No. 61/055,566 filed on May 23, 2008 entitled "Methods and Systems for Single Sign on with Dynamic Authentication Levels", which is hereby incorporated by reference herein in its entirety.

BACKGROUND OF THE INVENTION

1. Field of the Invention

The invention relates generally to user logon and authentication within a computer system. More specifically, the invention relates to user logon and logoff with multiple, and dynamic, authentication levels.

2. Description of the Related Art

Many applications, including web applications, require a user to authenticate themselves, or "sign on", before being able to access the application. Signing on to an application can be used to confirm a user's identity and/or authorization to access an application, thereby preventing any unauthorized access.

Applications use different types of authentication systems, even though they have the same goal of confirming a user's identify and authorization. These different authentication systems may use a username and password, challenge questions, one time known passwords, biometric, smartcards, or a variety of other known methods. Applications also have different requirements for the level of authentication required. Applications dealing with sensitive data, like bank account information, may require a stronger form of authentication (e.g. fingerprint) for access. In contrast, applications dealing with less sensitive data, like email, may only require a user name and password.

The above differences in applications between types and levels of authentication needed, can be difficult for a user to deal with, especially when the user desires to access a large number of applications. The user may be required to deal with many different types and levels of authentication. These requirements can be a burden for the user to comply with. The user may also be required to remember a large number of passwords or other authentication information in order to access the different systems.

Many applications, including web applications, also provide the ability to "sign off" or logoff an application. This can allow the application to free any resources being allocated to the user, and it allows the user to indicate they no longer desire to access the application. In order to access the application again, a user would need to re-authenticate themselves.

What is needed is a way for users to access many different applications with different types and levels of authentication in a simple and transparent manner.

SUMMARY OF THE INVENTION

Embodiments of the invention describe systems and methods for single sign on with dynamic authentication levels. These methods include a computer implemented method for automatically providing access to a second application to a user authenticated to a first application. The method includes receiving from the user authenticated to the first application, using at least one computer system communicating with an electronic network, a data request for access to the second application, wherein the user is authenticated to the first application at a first authentication level. The method also includes, processing by a computer server, by retrieving application information stored in a database, the minimum authentication level necessary to access the second application. The method also includes, receiving, from the user via the computer network, further authentication data to access the second application, provided in response to a request, wherein the type of the further authentication data required is based on the first authentication level and the minimum authentication level necessary to access the second application. The method also includes, authenticating the user to the second application at the minimum authentication level necessary to access the second application.

Embodiments of the invention also include a method for automatically stepping down a user authenticated to an application at a first authentication level, after a period of time, to a lower second authentication level. The method includes, receiving, using at least one computer system in communication with an electronic network, after a period of time, a request from a user to access the application. The method also includes stepping down, by a computer server, the user's authentication level from the first authentication level to a lower second authentication level, based on predetermined criteria, wherein the computer server updates session information regarding the user's authentication level, and wherein the predetermined criteria is the period of the time and the first authentication level. The method also includes receiving, through the computer network, further authentication data from the user, wherein the further authentication data is receiving in response to a request, and wherein the type of authentication requested from the user is based on the lower authentication level and the authentication necessary to access the application.

Embodiments of the invention also include a computer implemented method for automatically providing access to a second application to a user authenticated to a first application. The method includes, receiving from the user authenticated to the first application, using at least one computer system in communication an electronic network, a request, based on a selection of a link to access to the second application, wherein the user is authenticated to the first application at a first authentication level. The method also includes, determining by a computer server retrieving application information stored in a database, the minimum authentication level necessary to access the second application. The method also includes, receiving, from the user via the computer network, further authentication data to access the second application, provided in response to a request, wherein the type of the further authentication data required is based on the first authentication level and the minimum authentication level necessary to access the second application. The method also includes, receiving a token, via the computer network, along with a request for authentication to the second application, wherein the token contains the user's identification, and wherein the token is used by the second application to retrieve information about the user's session from a server storing user session information. The method also includes, the computer server retrieving the user's authentication data from user session information server using the token, and authenticating the user to the second application at the minimum authentication level necessary.

Embodiments of the invention also include a computer implemented system for automatically providing access to a second application to a user authenticated to a first application. The system includes at least one computer system in communication with an electronic network receiving from the user authenticated to the first application, a request, based on a selection of a link to access to the second application, wherein the user is authenticated to the first application at a first authentication level. The system also includes, a computer server, retrieving application information stored in a database, the minimum authentication level necessary to access the second application. The system also includes, receiving, from the user via the computer network, further authentication data to access the second application, provided in response to a request, wherein the type of the further authentication data required is based on the first authentication level and the minimum authentication level necessary to access the second application. The system also includes a token, received via the computer network along with a request for authentication to the second application, wherein the token contains the user's identification, and wherein the token is used by the second application to retrieve information about the user's session from a server storing user session information. The system also includes, the computer server retrieving the user's authentication data from user session information server using the token, and authenticating the user to the second application at the minimum authentication level necessary.

BRIEF DESCRIPTION OF THE DRAWINGS

Various objects, features, and advantages of the present invention can be more fully appreciated with reference to the following detailed description of the invention when considered in connection with the following drawings, in which like reference numerals identify like elements.

DETAILED DESCRIPTION OF EMBODIMENTS OF THE INVENTION

Figure 1:
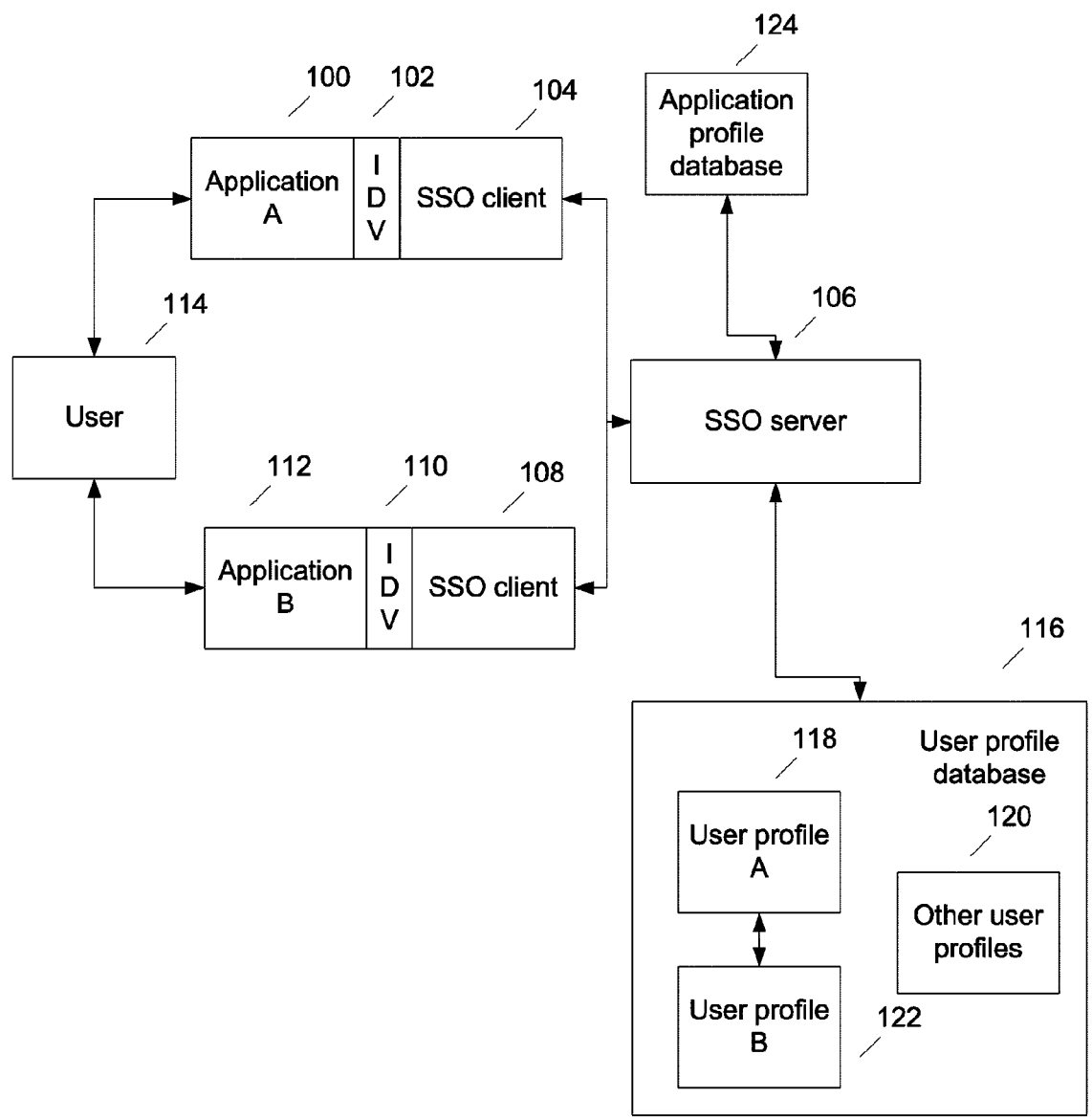
FIG. 1 is a system diagram showing the overall architecture of the single sign on (SSO) system.

Before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the invention be regarded as including equivalent constructions to those described herein insofar as they do not depart from the spirit and scope of the present invention.

In addition, features illustrated or described as part of one embodiment can be used on other embodiments to yield a still further embodiment. Additionally, certain features may be interchanged with similar devices or features not mentioned yet which perform the same or similar functions. It is therefore intended that such modifications and variations are included within the totality of the present invention.

Embodiments of the invention provide methods and systems for allowing a user to use a single sign on to access multiple applications. A user can sign on a single time and access multiple applications requiring the same level of authentication. The user does not need to provide any further verification or identification of themselves. When accessing applications requiring a greater level of authentication, the user can "step-up" their level of authentication by providing additional verification in accordance with the level of authentication required. A user can then access any application at the new "stepped up" level of authentication without further verification. This step-up authentication can be automatically requested by the application, or manually provided by the user in advance. The step-up authentication required can dynamically adjust to the user's current authentication level. Stepping up from very low level to a low level of authentication may only require entering a password, while stepping up from a medium to a high level, although it also represents only one level (or step) in the authentication hierarchy, may require a greater level of authentication information to be provided, such as two passwords, and biometric information. In this way, the authentication required dynamically adjusts to the user's current authentication level.

Embodiments of the invention also provide methods and systems for a single log off, allowing a user to log off all systems in a single action. Further, this log off can be specific to a certain authentication level. A user can log off all systems for which they are logged on at a certain authentication level in a single action (e.g. only all high security applications). A user can also "step-down" their authentication level, allowing them to access applications at a lower authentication level and/or logging off all application which require a higher authentication than the new lower authentication level.

Embodiments of the invention also include dynamic authentication adjustment features, including adjustments based on session timeout features. In some embodiments, after a certain period of inactivity, a user's authentication level will be reduced to a lowest level or completely removed. In other embodiments of the invention, after a timeout interval, the user's authentication level can be reduced one step ("step down"), for example from level 4 to level 3. After additional timeout interval(s), the user's authentication level can be reduced again from level 3 to level 2.

In other embodiments, this dynamic authentication adjustment makes adjustments based on the user's current authentication level. The interval before a user's authentication level is reduced can depend on the user's current authentication level and the authentication level they are being reduced to. For example, after 5 minutes of inactivity, a user's authentication level can be reduced from level 4 to level 3, but only after 10 additional minutes of inactivity, will the user's authentication level be reduced from level 3 to level 2. In this way, access to high security information can be better controlled. Examples of authentication levels and verification requirements are, level 1 authentication may require only a username, level 2 authentication may require a username and password level, 3 authentication may requires a username, password, and challenge question answer, and level 4 authentication may require in addition to level 3's requirements, biometric, fingerprint identification/smart card data, entry of a one time password (e.g. from an SMS text message), or further challenges. Of course, a greater or fewer number of authentication levels, along with different authentication requirements for those levels can be used.

Embodiments of the invention also allow a user to manually control and adjust their authentication level. A user can manually "step down" their authentication level, for example, to prevent accidental corruption of sensitive information or to prevent unauthorized access by others during periods of inattention. A user can also manually "step up" their authentication level and provide verification, for example, so that they will not be required to "step up" at a later inconvenient time.

Embodiments of the invention also include real-time failover support for central and/or regional SSO servers. In other embodiments, data stored within the SSO servers can also be encrypted, for example, using application keys within the HSMs.

Embodiments of the invention also can also be used with web applications containing multiple portlets. These web application can be hosted on various web servers connected to the Internet or other intranet (e.g. corporate intranet). Portlets allow a web page to present a view of multiples applications at a time to a user. Using embodiments of the invention related to single sign on, a user can access the web application and included portlets without have to provide verification multiple times, even if the portlets have different verification requirements. Further, in a web application have portlets requiring different levels of authentication, the system can calculate the highest level of authentication needed, and require only that level of authentication be provided from the user. In this way, a user can provide verification once at the maximum level needed to view the entire web page, including portlets.

Embodiments of the invention use a single sign on framework. The framework includes an application having a single sign on (SSO) client that communicates with an SSO client at a target application. A SSO server (central or distributed) maintains a database of user profiles and linked user profiles. Both the host and target applications have authentication subsystems for performing authentication when necessary, for example, the first access or when stepping up. Embodiments of the invention also include methods and systems for allowing a user to create a profile within the SSO server, and to link multiple profiles together for SSO purposes. The SSO client also maintains session information about the user, for example, the current authentication level. The SSO client can also cache session information for faster access.

The SSO framework can be built using a client-server model, where applications have an authentication subsystem for authenticating a user, and an SSO client for communication with an SSO server. In some embodiments of the invention, these authentication subsystems can be shared. Through the SSO server and the user's application interface (e.g. a web browser), applications can communicate regarding a user's current authentication level, allowing the user to be automatically authenticated to another application. Clients and servers can be connected through any type of network, includes the Internet, a corporate intranet (e.g. corporate wide area network). The user's application interface (e.g. a web browser) can also incorporate various web and Internet technologies including encryption and AJAX. In alternative embodiments, the client application can be a native application on the user's operating system (e.g. a Microsoft windows application, a java application on a mobile phone).

In operation, the SSO process begins with the authentication subsystem of a first application sending a credential challenge to the user's application interface (e.g. web browser) being used to access the application. This credential challenge can be, for example, a request for a user name and password. This process assumes the user already has linked accounts at the first application and a second application. The user responds to the credential challenge and provides the login information to verify themselves. The user then selects a remote resource through the first application (e.g. though an http link), for example, to access a fund transfer application.

The authentication subsystem requests an artifact (token) from the SSO client. The SSO client makes a request to the SSO server to generate a token for accessing the particular remote resource that is part of the second application. The SSO client uses a service provided by the SSO server and sends it the necessary parameters for the token to be generated. This can include a global user identification (GUID), the user's current authentication level, and the identification of the target (second) application. The SSO server then responds with a token to the SSO client of the first application.

The token is passed to the user's application interface, which forwards it to the second application where the remote resource is located. The token is passed to the second application's SSO client, which uses the token to verify the user's access. The second application obtains the user's GUID and other information from the token, and uses the information to access a verification service provided by the SSO server. The SSO server can then determine whether the user is verified, and if the user's current authentication level is sufficient to access the second application. If necessary, the second application asks for further verification to increase the user's authentication level. This information is then passed to the SSO server through the SSO framework. At this point, the user (with the additional authentication if necessary) is able to access the second application. This process is performed transparently, and generally, no additional action is needed by the user beyond the request to the remote resource.

Embodiments of the invention include being implemented on a computer system. The computer system includes a bus or other communication mechanism for communicating information, and a processor coupled with the bus for processing information. The computer system also includes a main memory, such as a random access memory (RAM) or other dynamic storage device, coupled to the bus for storing information and instructions to be executed by the processor. Main memory also may be used for storing temporary variables or other intermediate information during execution of instructions to be executed by the processor. The computer system further includes a read only memory (ROM) or other static storage device coupled to the bus for storing static information and instructions for the processor. A storage device, such as a magnetic disk or optical disk, is provided and coupled to bus for storing information and instructions.

The computer system may be coupled via bus to a display, such as a cathode ray tube (CRT), for displaying information to a computer user. An input device, including alphanumeric and other keys, is coupled to the bus for communicating information and command selections to the processor. Another type of user input device is cursor control, such as a mouse, a trackball, or cursor direction keys for communicating direction information and command selections to the processor and for controlling cursor movement on display. This input device typically has two degrees of freedom in two axes, a first axis (e.g., x) and a second axis (e.g., y), that allows the device to specify positions in a plane.

The invention is related to the use of the computer system for single sign on. According to one embodiment of the invention, single sign on is provided by the computer system in response to the processor executing one or more sequences of one or more instructions contained in the main memory. Such instructions may be read into the main memory from another computer-readable medium, such as a storage device. Execution of the sequences of instructions contained in the main memory causes the processor to perform the process steps described herein. One or more processors in a multi-processing arrangement may also be employed to execute the sequences of instructions contained in the main memory. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to the processor for execution. Such a medium may take many forms, including but not limited to, non-volatile media, volatile media, and transmission media. Non-volatile media includes, for example, optical or magnetic disks, such as a storage device. Volatile media includes dynamic memory, such as main memory. Transmission media includes coaxial cables, copper wire and fiber optics, including the wires that comprise the bus. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to the processor for execution. For example, the instructions may initially be carried on a magnetic disk of a remote computer. The remote computer can load the instructions into its dynamic memory and send the instructions over a telephone line using a modem. A modem local to the computer system can receive the data on the telephone line and use an infra-red transmitter to convert the data to an infra-red signal. An infra-red detector coupled to the bus can receive the data carried in the infra-red signal and place the data on the bus. The bus carries the data to main memory, from which the processor retrieves and executes the instructions. The instructions received by the main memory may optionally be stored on the storage device either before or after execution by the processor.

The computer system also includes a communication interface coupled to the bus. The communication interface provides a two-way data communication coupling to a network link that is connected to a local network. For example, the communication interface may be an integrated services digital network (ISDN) card or a modem to provide a data communication connection to a corresponding type of telephone line. As another example, the communication interface may be a local area network (LAN) card to provide a data communication connection to a compatible LAN. Wireless links may also be implemented. In any such implementation, the communication interface sends and receives electrical, electromagnetic or optical signals that carry digital data streams representing various types of information.

The network link typically provides data communication through one or more networks to other data devices. For example, the network link may provide a connection through the local network to a host computer or to data equipment operated by an Internet Service Provider (ISP). The ISP in turn provides data communication services through the world wide packet data communication network now commonly referred to as the "Internet". The local network and the Internet both use electrical, electromagnetic or optical signals that carry digital data streams. The signals through the various networks and the signals on the network link and through the communication interface, which carry the digital data to and from the computer system, are exemplary forms of carrier waves transporting the information.

The computer system can send messages and receive data, including program code, through the network(s), the network link and the communication interface. In the Internet example, a server might transmit a requested code for an application program through the Internet, the ISP, the local network and the communication interface. In accordance with the invention, one such downloaded application provides for single sign on as described herein.

FIG. 1 is a system diagram showing the overall architecture of the single sign on (SSO) system. A client server architecture is shown that includes a user 114 accessing a first application and its components (100, 102, and 104) and a second application and its components (112, 110, and 108). Each of the applications is connected to an SSO server 106, and through the SSO server, a user profile database 116, and an application profile database 124.

User 114 is the user of an application (e.g. a web application). In the client server architecture shown, the user 114 would be accessing application A 100 and application B 112 through a client application, such as a web browser.

Each application has an identification and verification component (102 and 110) along with an SSO client (104 and 108). The identification and verification (IDV) component is responsible for authenticating a user to an application. One way this can be done, is through the single sign on architecture, which can be accessed by the IDV component through an SSO client (104 and 108).

The SSO framework provides an identity management service. This framework can create tokens and process received tokens to authenticate a user to an application that is connected to the framework. This can happen during the linking process. A user profile database 116 is also used to support the implementation for identify management. The user profile database can be an LDAP database that is populated when a user registers with a site. For example, a user may register with an overall website, entering the requested registration information (e.g. name, address, account information). The user can then access one or more applications at the site, such as, a checking application, a money transfer application, etc. The user profile data is used when a user links to an application.

SSO server provides the back end support for implementation of the SSO framework. The SSO server 106 is responsible for creating tokens and accessing information about users and their linked accounts. SSO server is connected to a user profile database 116. This database can be centralized or distributed. The user profile database 120 includes information on the user 114 and their account with application A 100, shown by user profile A 118, and on the user's account with application B 112, shown by user profile B 122. The user profiles database can also include information on numerous other users.

User profile A can include information such as the username and password that user 114 must provide to access application A 100. Similarly, it can also contain whatever information is necessary to authenticate a user for the authentication method being user. For example, it can contain biometric information, if a biometric authentication type is being used. It can also contain information about multiple types of authentication levels depending on the requirements of the application. For example, an application may allow access at different levels, with corresponding different levels of functionality provided. User profile database 116 can also contain information about which profiles, such as user profile A and user profile B are linked together for single sign on purposes. By comparing the authentication information provided by a user to the information in a user's profile for a particular application, the SSO server can verify a user is allowed to access to the application.

Communication between the SSO server and client can be through any type of network, including the Internet or a corporate intranet. Similarly, the user may communicate with the Application A 100 and Application B 112 over the Internet. These applications may be hosted on two different web server, for example two different web sites of the same corporate owner. These web sites however can still share the same single sign on framework, creating a more seamless user experience and simplifying the infrastructure. Alternatively, the user can access applications over the Internet, while the backend single sign on infrastructure is connected to the webserver hosting the application through and internal network (e.g. corporate intranet, wide area network, local area network). SSO server 106 can also access application profile database and 124 and user profile database 116 over any type of network, include the Internet or a corporate intranet. In some embodiments of the invention, multiple applications can be hosted on the same webserver or website, and be accessed through various uniform resource locators (URL) or other identifiers.

Figure 2:
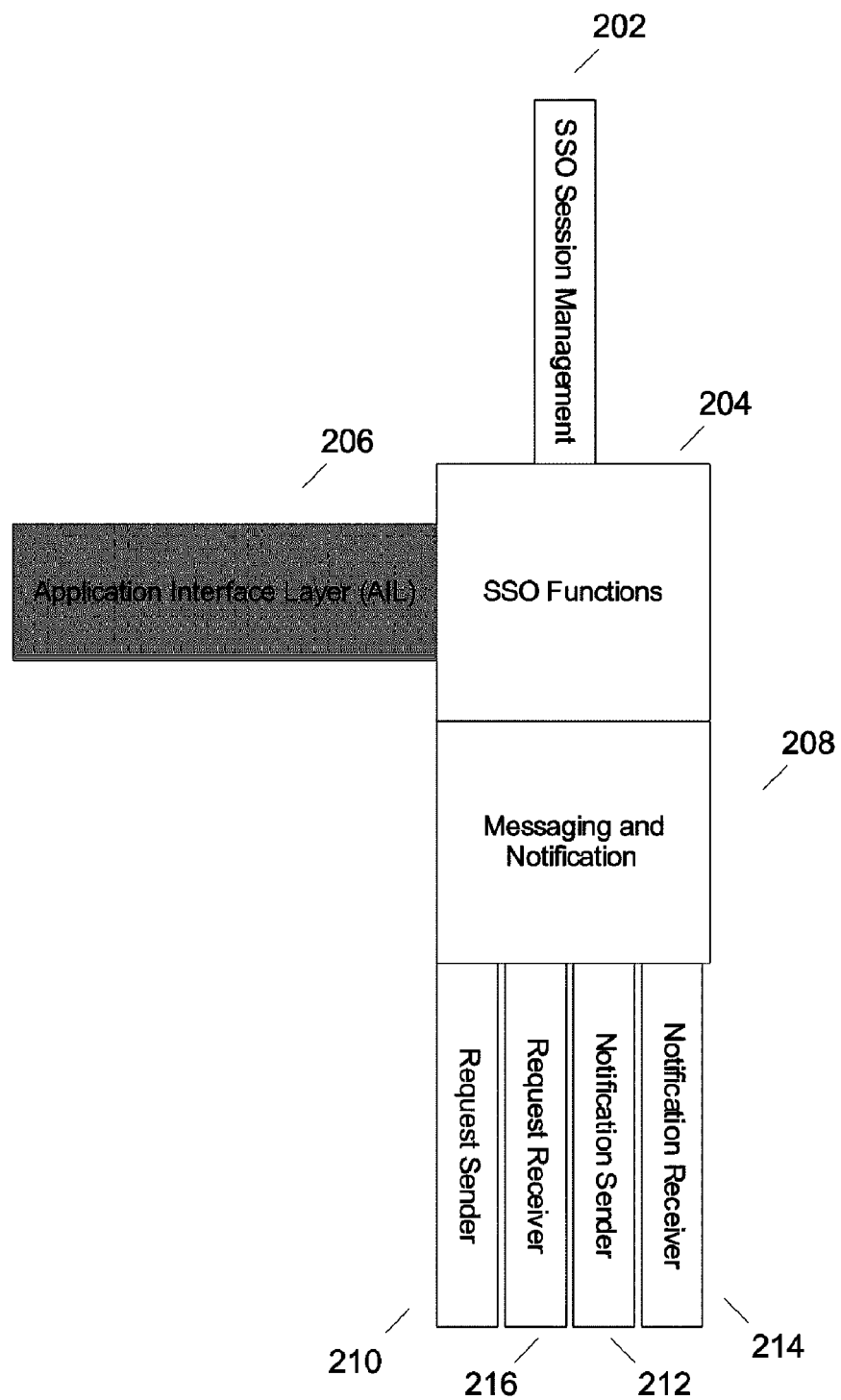
FIG. 2 is a diagram showing the architecture of the SSO client component.

FIG. 2 is a diagram showing the architecture of the SSO client component 104. The client component 104 includes components related to SSO session management 202, core SSO functions 204, application interface 206, messaging and notification 208, and messaging and notification sub components 210-214.

Application interface layer 206 provides an API for applications (and the SSO client) to access the functionality of the SSO framework. This includes providing an interface to the token creation and verification functionality, the session creation and verification functionality, and the identity management functions. It also handles errors and exceptions that arise from use of the SSO framework.

SSO functions 204 provides an interface to implement logic for SSO activities like session management, token management, identity management, and messaging and notification. The SSO functions component 204 also contains logic for handling SSO events and messages. SSO session manager component 202 is responsible for managing a user's session including their authentication level. The SSO session manager caches session entries for better performance, validates sessions periodically, and manages the active and inactive sessions. It also provides and API for session management.

The messaging and notification component 208 generally manages the communication layer, including providing connection pooling and load balancing. This component also provides an API for event notification registrations, and for the event notifications themselves. More specifically, this component can also handle message marshalling and unmarshalling, for example, wrapping the messaging in a specific protocol like Simple Object Access Protocol (SOAP) or an Internet Services Model (ISM).

Messaging and notification component 208 has four subcomponents. Notification receiver 214 handles receiving of notifications. Notification sender 212 handles sending of notifications. Request receiver 216 handles receiving of notifications. Request sender 210 handles sending of notifications.

Figure 3:
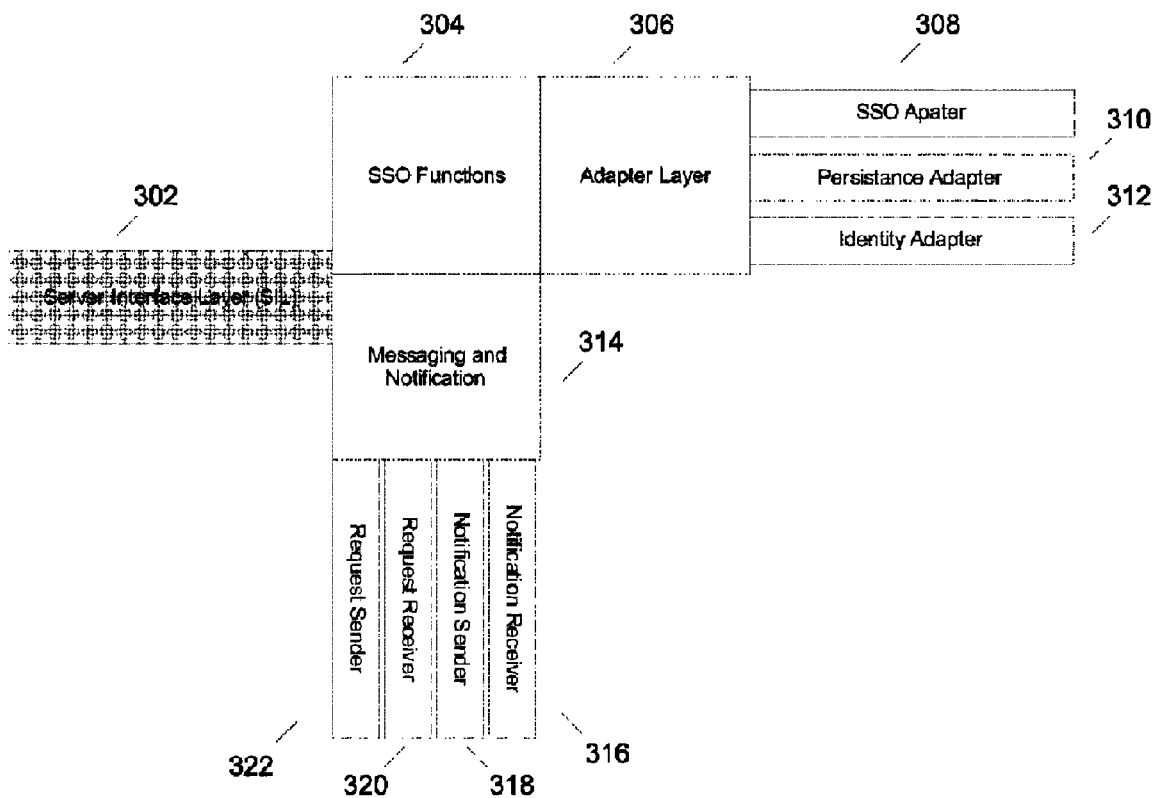
FIG. 3 is a diagram showing the architecture of the SSO server component.

FIG. 3 is a diagram showing the architecture of the SSO server component. The SSO server component includes, similar to the SSO client, an SSO function component 304 and a messaging and notification layer 314 including subcomponents 316-322. SSO server component also includes a server interface layer 302 and adapter layer 306.

The server interface layer 302 provides an API interface for the server's functions. This interface can be used by the SSO clients of one or more applications to access the SSO server's functionality, for example, verifying tokens, linking accounts, de-linking accounts, messaging and notification, and generating tokens. SSO functions 304 implements the corresponding logic for the provided functions. The SSO function component also manages the SSO session, subscribes for notifications, and responds to SSO events.

The adapter layer 306 provides an interface that can be adjusted for specific SSO solutions. More specifically, the SSO adapter 308 provides functionality for token creation and verification. The persistence adapter 310 provides support for specific persistence types, for example, relational databases (e.g. Oracle), LDAP, etc. This interface can also provide functions for creating transactions, committing transactions, and roll back. The identify adapter 312 can implement specific identity solutions and provides an API for identity management.

Figure 4:
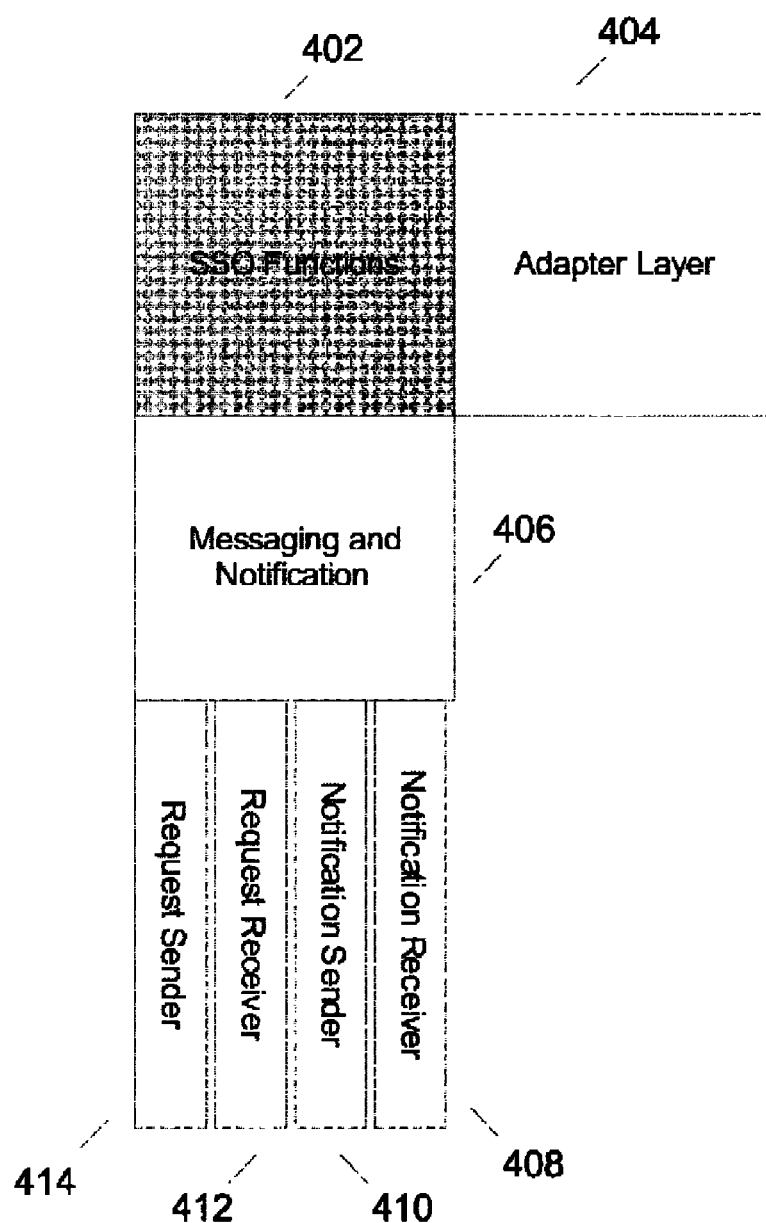
FIG. 4 is a diagram showing the architecture of the SSO common components.

FIG. 4 is a diagram showing the architecture of the SSO common components. This figure shows those components that are shared between the SSO client and the SSO server. These components have been described with respect to FIGS. 2 and 3.

Figure 5:
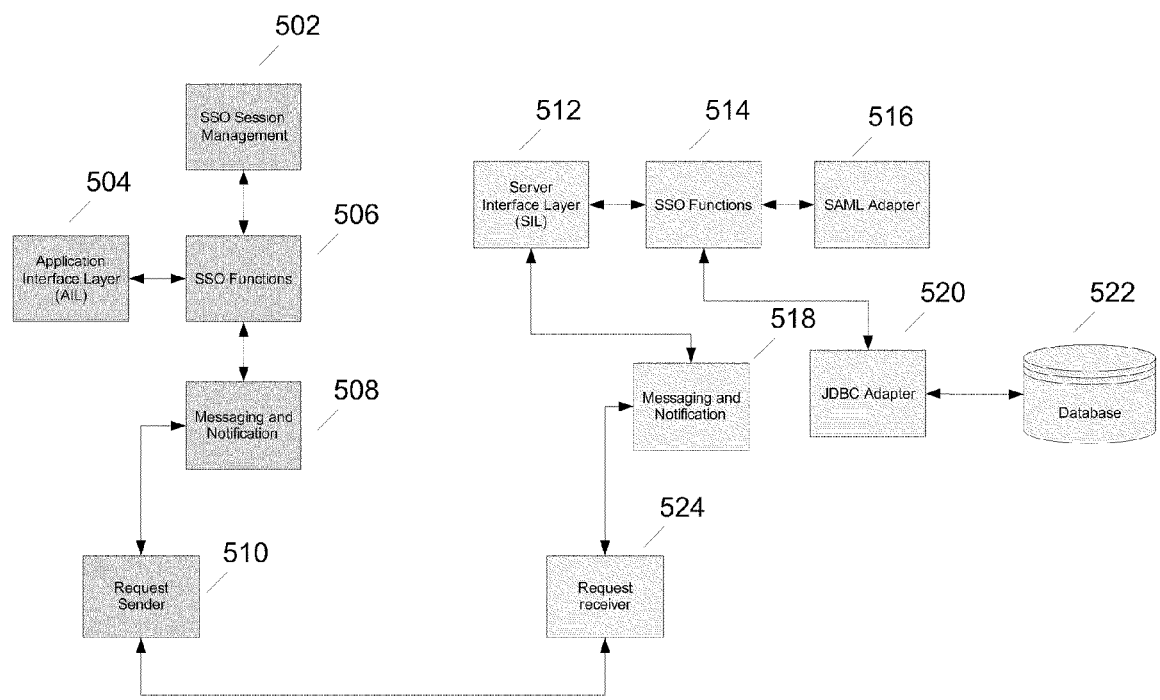
FIG. 5 is a system diagram showing the communication between components of the SSO client and the SSO server.

FIG. 5 is a system diagram showing communication between components of the SSO client and the SSO server. Communication is shown between the client side components 502-510 and server side components 512-524.

Applications communicate with the client side component through application interface layer 504. Application interface layer is in communication with the SSO functions component 506, which provides the logic and functionality of the client side component. SSO function component 506 works with the session management component 502 to manage a user's SSO session, and the messaging and notification component 508 to communicate with the server side SSO framework. This is handled, for example, through the request sender 510 messaging and notification component.

On the server side, token creation requests are received by the request receiver component 524 of messaging and notification component 518. The request is then sent to the server interface layer 512, which provides an interface to the server logic and functionality of the SSO functions component 514.

The SSO functions component 514 works with the SAML adapter and a persistence adapter, for example, Java Database Connectivity Component adapter 520, through which user profile and other information can be accessed in database 522.

Figure 6:
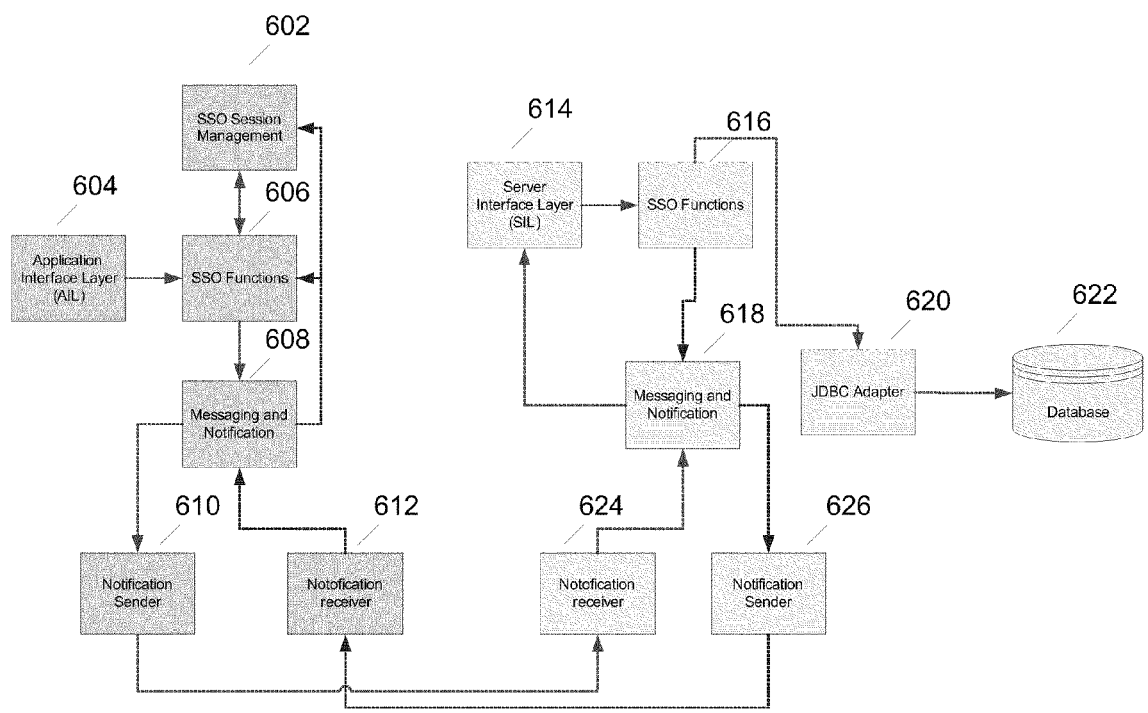
FIG. 6 is a system diagram showing the communication of a notification between the components of the SSO client and the SSO server.

FIG. 6 is a system diagram showing the communication of a notification between the components of an SSO client and an SSO server. This figure shows communication of information back from server side components 614-626 to client side components 602-612. A response is being generated by the server side SSO functions component 616 and is sent to messaging and notification component 618, before being sent to notification sender 626 for response to the client side. The response is generated using the SSO functionality and information from database 622, which is accessed through JDBC adapter 620.

On the client side, the message is received by notification receiver 612, where it is sent to messaging and notification component 608, then to SSO functions component 606 and eventually back to the application through application interface layer 604.

Figure 7:
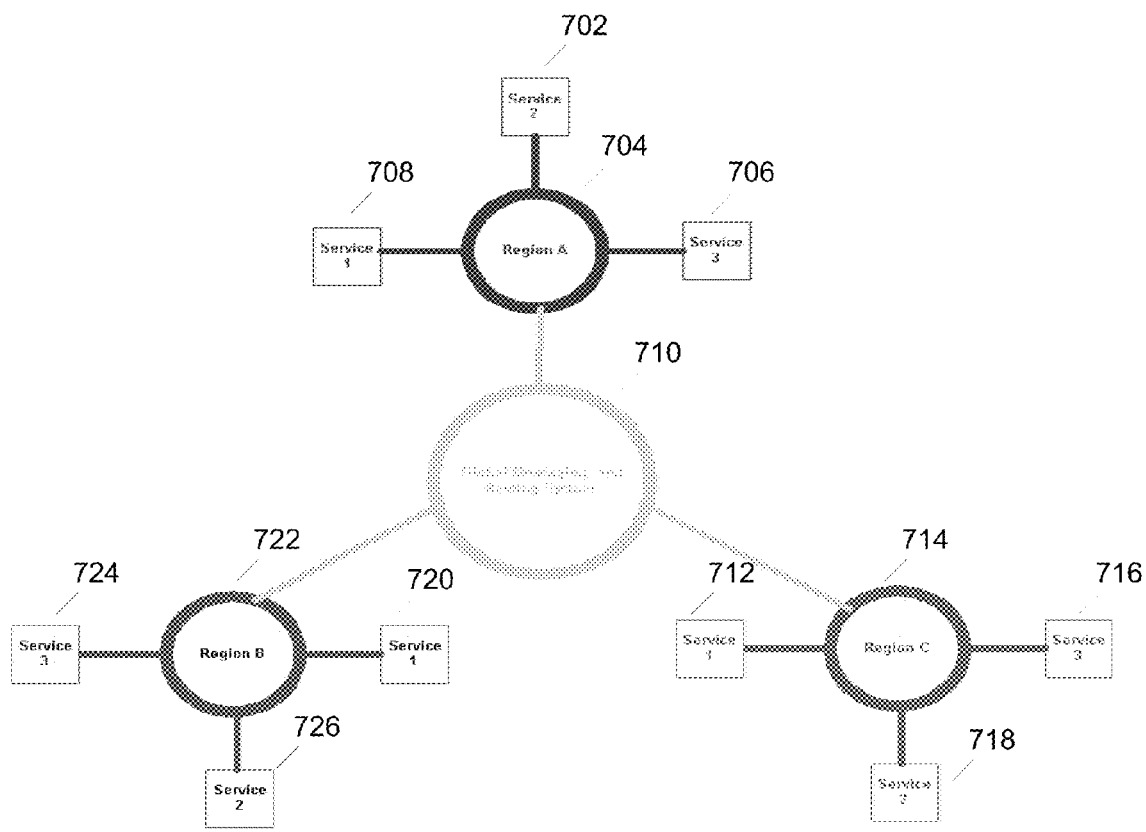
FIG. 7 is a system diagram showing the logical messaging model.

FIG. 7 is a system diagram showing one logical messaging model that can be used with the SSO framework. FIG. 7 shows that communication between messaging and notification components of various SSO client and SSO servers, which may be widely distributed both geographically and logically, can be performed through global messaging and routing system 710.

Global routing and messaging system can handle the routing of messages from various regional hubs, for example, region A 704, region B 722, and region c 714. Each of these regional hubs is connected to various SSO services, for example, region A is connected to services 702, 706, and 708, region B is connected to services 720, 724, and 726, and region C is connected to services 712, 716, and 718.

Messages from a service in one region (e.g. service 1 712) to a service in the same region (e.g. 718) can be handled within the regional hub. Messages between a service in one region (e.g. server 1 712) and a service in another region (e.g. service 1 708) can be transmitted through global messaging and routing system 710. By using a distributed messaging and routing model, the performance of the system can be improved. This is important during high load conditions, for example, during failure of one set of services, or during a particular time of day when traffic is heavy.

Figure 8:
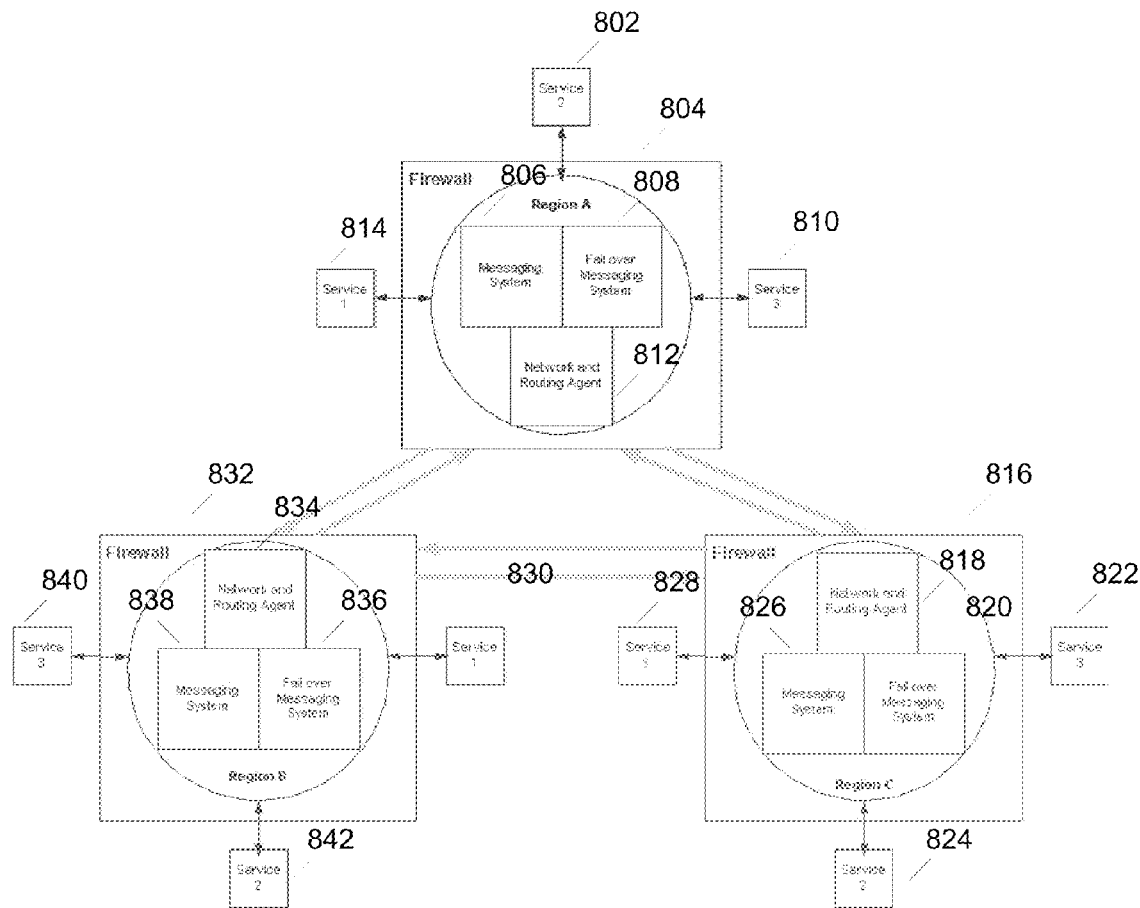
FIG. 8 is a system diagram showing the infrastructure of the logical messaging model.

FIG. 8 is a system diagram showing the infrastructure of the logical messaging model. FIG. 8 shows that each region, for example, region 804, includes a firewall 805, a messaging system 806, a fail-over messaging system 808, and a network and routing agent 812. Attached to this region 804 are various services such as 802, 814, and 810. These can be either client side or server side services.

For disaster preparedness reasons, the infrastructure includes both a messaging system 806 as described previously, and a back-up or failover messaging system 808. This system 808 has the same resources and setup as messaging system 806 and can take over if necessary. This greatly increases the availability of the system. Network and routing agent contains logic and information to route a message from a service in one region to another service in either the same or a different region. As shown in FIG. 8, regions B and C have the same design.

Figure 9A:
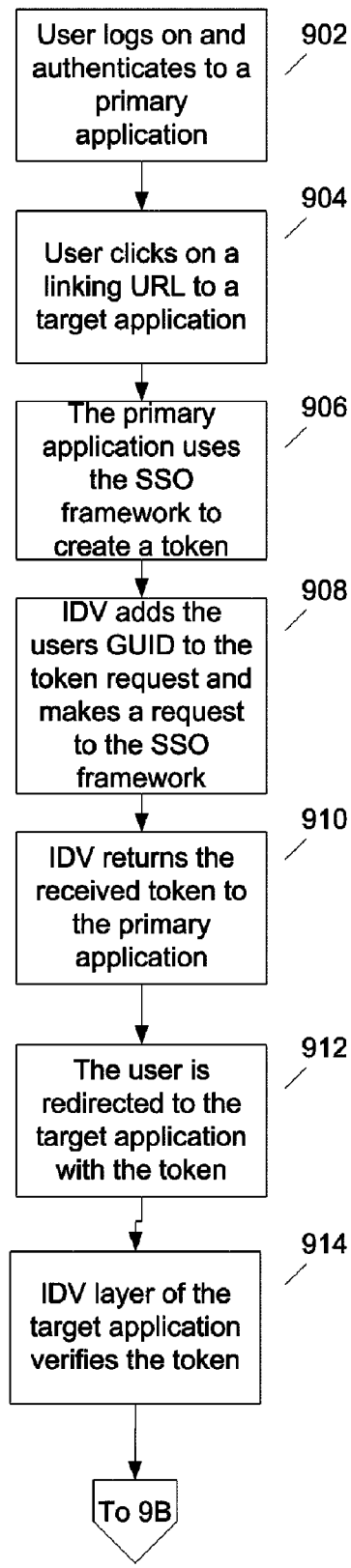
FIG. 9A is a flow diagram showing the process for linking to another application using the single sign on process, including step up authentication.

FIG. 9A is a flow diagram showing the process for linking to another application using the single sign on process, including step up authentication. The process includes a user logging on and authenticating to a primary application, then linking to a second application. The system calculates the level of authentication needed by the user, and challenges the user for additional authentication information if necessary. If no additional authentication is needed, then the user will transparently be able to access the second application.

The process begins at step 902 by a user logging on and authenticating to a primary application. As described above, this includes a user providing identification (e.g. a user name) and authentication information (e.g. password, biometric information, one time pass word (OTP), and digital certificate) to the application. This information can be verified by the IDV component through the single sign on client and single sign on server. The single sign on server has access to user profile database 116, which can be used for authentication purposes.

At step 904, in a web application based embodiment of the invention, to access a second application the user selects a link (uniform resource locator (URL)). At step 906, upon receiving this request, the primary application begins the SSO process by requesting the SSO framework to generate a token for the user that can be sent to the target application and used to verify the user's access.

At step 908, the IDV layer receives the request from the primary application to create a token, and adds the users GUID to the request before forwarding it onto the SSO server. The SSO server generates a token for the user to access the target application using the user's profile information contained in the user profile database. The information can be located using the user's GUID.

At step 910, the IDV layer returns the token generated by the SSO server to the primary application. The primary application then sends the token to the user's client application, such as a web browser. The token can be sent to the web browser in the form of a cookie, embedded within the URL, or through certain HTTP headers. The client application therefore has a copy of the token which it can send to the target application.

At step 912, the user is redirected from the primary application to the target application. In a web application embodiment of the invention, this can be done using refresh URLs and HTTP redirects. The user's client application also provides the token to the target application. As described above, this can be provided as a cookie, information in the URL, or information in the HTTP headers. At step 914, the target application passes the token to its IDV layer which begins the process of verifying it using the SSO client and the SSO framework.

Figure 9B:
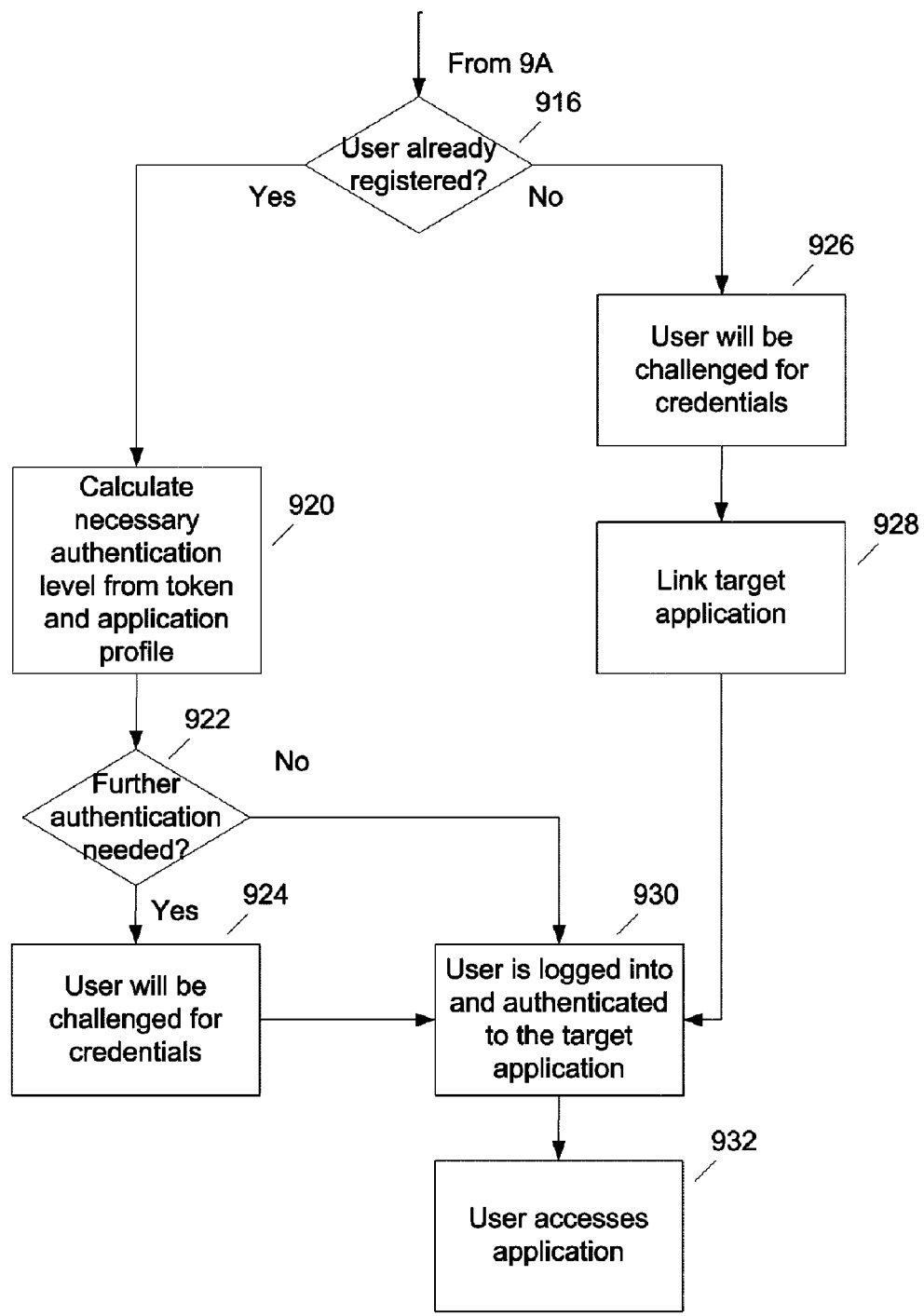
FIG. 9B is a flow diagram showing the rest of the process of for linking to another application using the single sign on process, including step up authentication.

FIG. 9B is a flow diagram showing the rest of the process of for linking to another application using the single sign on process, including step up authentication. At step 916, the SSO framework determines if the user is already registered with the SSO framework for single sign on operations. Before a user can use the SSO process to access other applications, the user's profiles for those applications must be linked together in the user profile database. This is shown by link between user profile A 118 and user profile B 122 in FIG. 1. Alternatively, all or some applications that a user accesses can be automatically linked together, for example, those applications using the same unique username or identification code.

SSO take date from front end and pushes into the framework server, before you can token creation.

At step 926, if the user profile for the target application is not linked, then the user is challenged for credentials to access the target application, just as they normally would have been without the SSO framework. At step 928, after the user has provided the correct credentials, the target application can be linked to the primary application. Alternatively, an account for the user to access this target application can be created if it is their first time accessing the application. At step 930, the user is logged on and authenticated to the target application. At step 932, the user can access the application the same as any other application.

At step 920, if the user was already registered with the target application, then using the provided token, the SSO framework will determine the user's current authentication level and the authentication level necessary to access the target application. For example, the user's current authentication level can be stored in the token or the user's session on the SSO server. The authentication level necessary to access an application can be stored in an application profile database 124 as shown in FIG. 1. At step 922, the SSO framework determines if the user's authentication level is sufficient to access the application or if further authentication is needed. If no further authentication is needed, then at step 930 the user is logged into and authenticated to the target application. In this case, the user has been able to access the target application by doing no more than clicking a link from the primary application, and in some cases, registering the target application as a linked application.

At step 924, if the user's current authentication level is not sufficient to access the target application then the users are challenged for additional credentials. This challenge is based on both the user's current authentication level and the authentication level necessary to access the application. For example, if moving from a very low to a very high authentication level the user may need to provide biometric authentication information. As another example, if the user is moving from a very low authentication level to a slightly higher authentication level, they may only need to provide the answer to a challenge question (e.g. what is your mother's maiden name).

In some embodiments of the invention, the above single sign on process can be applied to make viewing of pages with portlets easier and more transparent for a user. Portlets are portions of a website embedded within another website. In some cases, a website can contain a number of portlets. A portlet could show the weather, or the value of a user's bank account. Those portlets showing private information can have authentication requirements of their own, potentially requiring the user to authenticate separately to each portlet being shown.

Using the single sign on framework, an application can determine which portlets are going to be shown to the user, and then determine the highest level of authentication that would be needed by the user to view all the portlets. The application can then automatically request the user step up their authentication before showing the user a webpage page with included portlets. After the user's authentication has been stepped up, the application can request a token from the SSO framework for the user's web browser. The user's web browser can send this token for single sign on to each of the applications providing the portlets. For example, these portlets may be served from different applications and/or on different servers.

Figure 10:
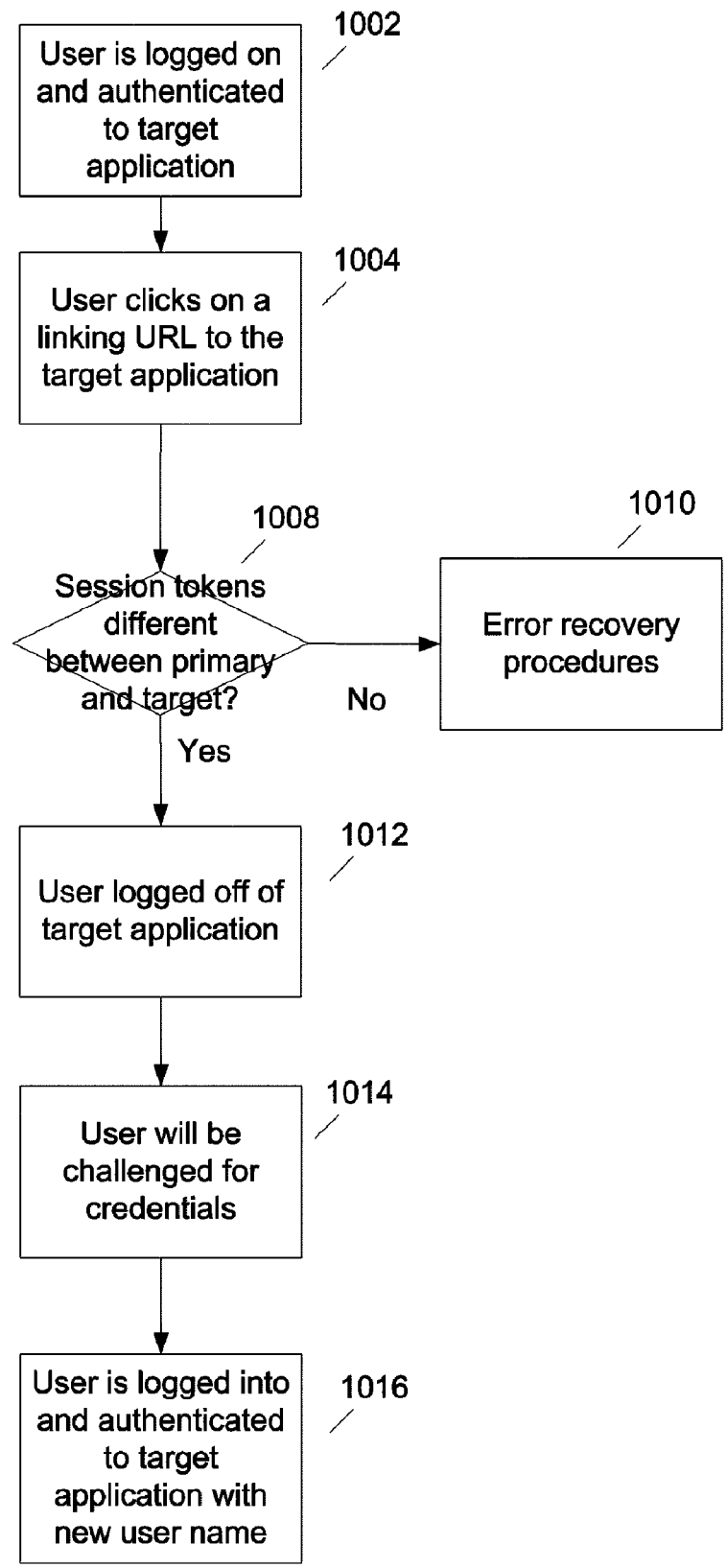
FIG. 10 is a flow diagram showing the process for linking to another application as a different user.

FIG. 10 is a flow diagram showing the process for linking to another application as a different user. At step 1002, the logs on and is authenticated to the target application. Similar to the web based embodiment of FIG. 9, at step 1004, the user clicks on a URL to access a target application with a different username.

At step 1008, during the authentication process, the SSO framework determines that the user's current session token, and the session token generated from the user accessing the target application with a username, do not match. In response, at step 1012, the SSO framework automatically logs the user off the target application under the original username. At step 1014, the user will be challenged for new credentials under the new username. At step 1016, the user is authenticated and logged onto the same target application but under the new user name and credentials. If there are any problems comparing session tokens, then at step 1010, the SSO framework uses its available error recovery procedures.

Figure 11:
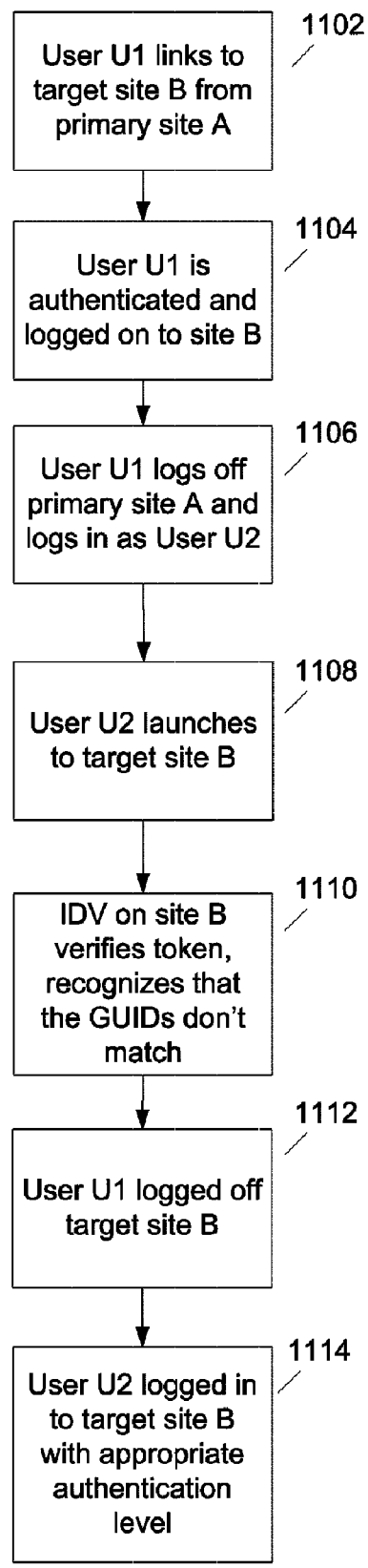
FIG. 11 is a flow diagram showing the process for linking to the same application as a different user.

FIG. 11 is a flow diagram showing the process for linking to the same application as a different user. At step 1102, the user is already logged on and authenticated to a primary site A before they link to target site B. At step 1104, the user logs on and authenticates to target site B. At step 1106, the user logs off primary site A and logs on and authenticates as a different user. At step 1108, the user links to target site B under their new user name. At step 1110, the SSO framework begins the SSO process and verifies the user's token. The SSO framework determines that the GUID of the user does not match the GUID of the user logged into the target site. At step 1112, the original user is automatically logged off the target site B. At step 1114, the new user is logged into the target site B at the appropriate authentication level using the single sign on process.

Figure 12:
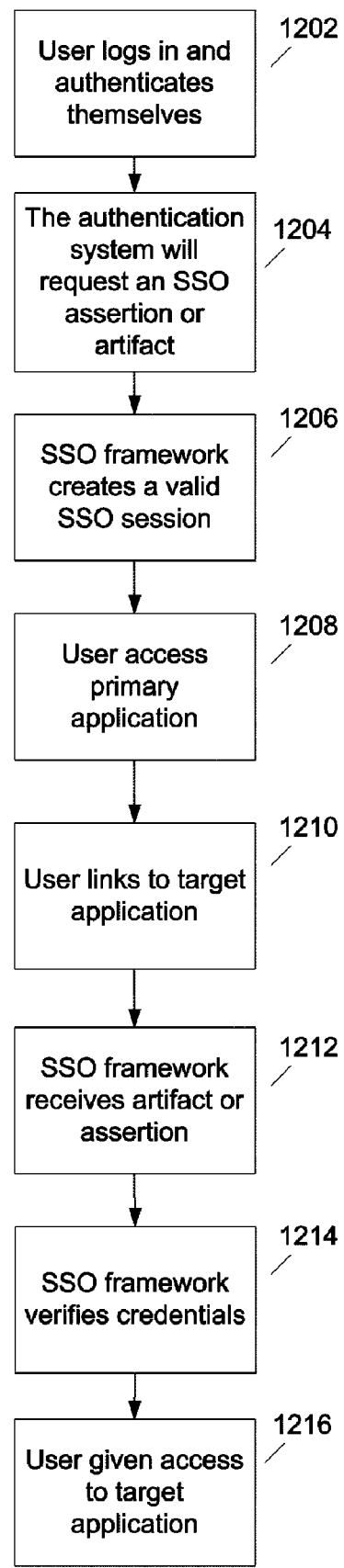
FIG. 12 is a flow diagram showing further details of the SSO process.

FIG. 12 is a flow diagram showing further details of the SSO process. As step 1202, the user logs on and authenticates themselves to the primary application. At step 1204, the IDV and authentication subsystem of the application will request an SSO assertion or artifact from the SSO framework. Either authentication model can be used.

One verification model the SSO framework can use is the artifact model. When the SSO framework is based on an artifact model, a token that is passed between the host application and the target application (e.g. through a web browser) contains an identifier used to access information about the user's SSO session in the central SSO server. In this way, the token provides a reference to information within the SSO server that can be used by the target application to verify a user and allow them access to the target application.

This token can be encrypted using one or more levels of encryption, for example, using public key cryptography. The token information can be encrypted using the host application's private key (contained within the SSO server) and decrypted by the target application using the host application's public key (contained within the SSO server). Alternatively, a pair of session keys can be created to encrypt and decrypt the tokens. The entire communication itself between a client (e.g. browser) and an application (e.g. web application) can also be encrypted through any number of protocols, including SSL (using HTTPS).

Another verification model the SSO framework can use is an assertion model. In an assertion model, multiple distributed SSO servers are used within the SSO framework. The system includes regional SSO servers, which manage SSO operations for the applications in the region. The central SSO server is used for profile creation and linking. Information about created and linked profiles is distributed to regional SSO servers, which are then able to handle SSO operations from a target application.

In the assertion model, the information necessary to verify a user is carried in the token itself, for example as an encrypted and/or digitally signed XML message. The token can also include the user and link information. The host application can encrypt the token with the application's private key. The target application has the host application's public key and is therefore able to decrypt information encoded by the host application and send all the information needed for verifying the user to the regional SSO server. Therefore, the regional SSO servers do not need to communicate for verification and authentication purposes. Token information is encrypted using a set of shared application keys between the distributed SSO servers. For example, as included within hardware security managers (HSMs). The keys within the HSMs can be replaced on a periodic interval or at other times.

At step 1206, the SSO framework creates a valid SSO session for the user so that they can access the target application using the SSO process. At step 1208, the user accesses the primary application.

At step 1210, the user links to the target application. At step 1212, as described above, the SSO framework receives the artifact or assertion. At step 1214, the SSO framework verifies the user's credentials using the artifact or assertion. At step 1216, the SSO framework sends a message to the target application notifying it that the user has been verified. The user can then access the target application.

Figure 13:
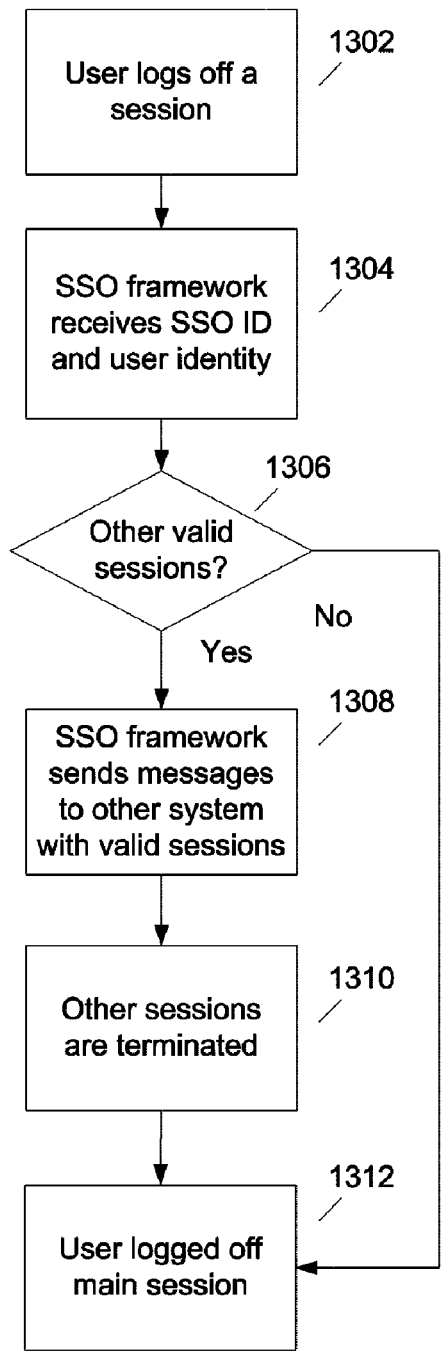
FIG. 13 is a flow diagram showing the single log off process.

FIG. 13 is a flow diagram showing the single log off process. The user is already logged into one or more applications. At step 1302, the user logs off an application, for example, by clicking a log off link. Logging off an application allows a user to signal they are done using the application, and allows the application to free any resources that might have been allocated to the user.

At step 1304, the SSO framework receives the SSO ID and the user's identity. At step 1306, the SSO framework uses the user's ID to check the current SSO sessions. At step 1308, the SSO framework uses the messaging system to send a message to the SSO clients of the other applications in which the user has a valid session. At step 1310, the other sessions are terminated by the corresponding applications using the SSO framework. At step 1312, the user is logged off their main session. Alternatively, the SSO framework can terminate the user's other sessions without interacting with the corresponding applications.

Alternatively, a user can signal different log off conditions to the SSO framework. For example, a user can request to be logged off only the highest security level applications. This logging off can also include a corresponding stepping down of their authentication level. In that case, a user would need to re-authenticate themselves to log back on to the application. However, there does not need to be a corresponding step-down of authentication.

Figure 14A:
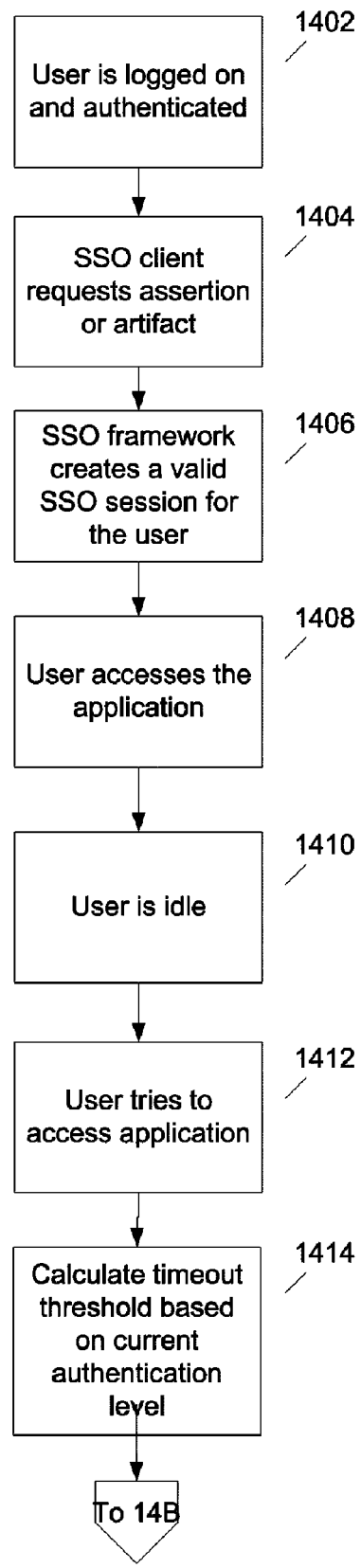
FIG. 14A is a flow diagram showing the process for dynamic session timeouts based on authentication levels.

FIG. 14A is a flow diagram showing the process for dynamic session timeouts based on authentication levels. At step 1402, a user logs on and authenticates to an application. At step 1404, the SSO framework requests an artifact or assertion. At 1406, the SSO framework creates a valid SSO session for the user.

At step 1408, the user accesses the application as they normally would. At step 1410, the user is idle for a period of time, for example, 15 minutes. At step 1412, the user tries to access the application again. At step 1414, the SSO framework applies a timeout threshold based on the user's current authentication level before allowing the user to access the application. For example, if the user was logged in at a high authentication level, the user would be logged off and not allowed to access the application after 15 minutes. In contrast, if the user was logged in at a low authentication level, they would still be allowed to access the application, and would only be logged out after 30 minutes.

Figure 14B:
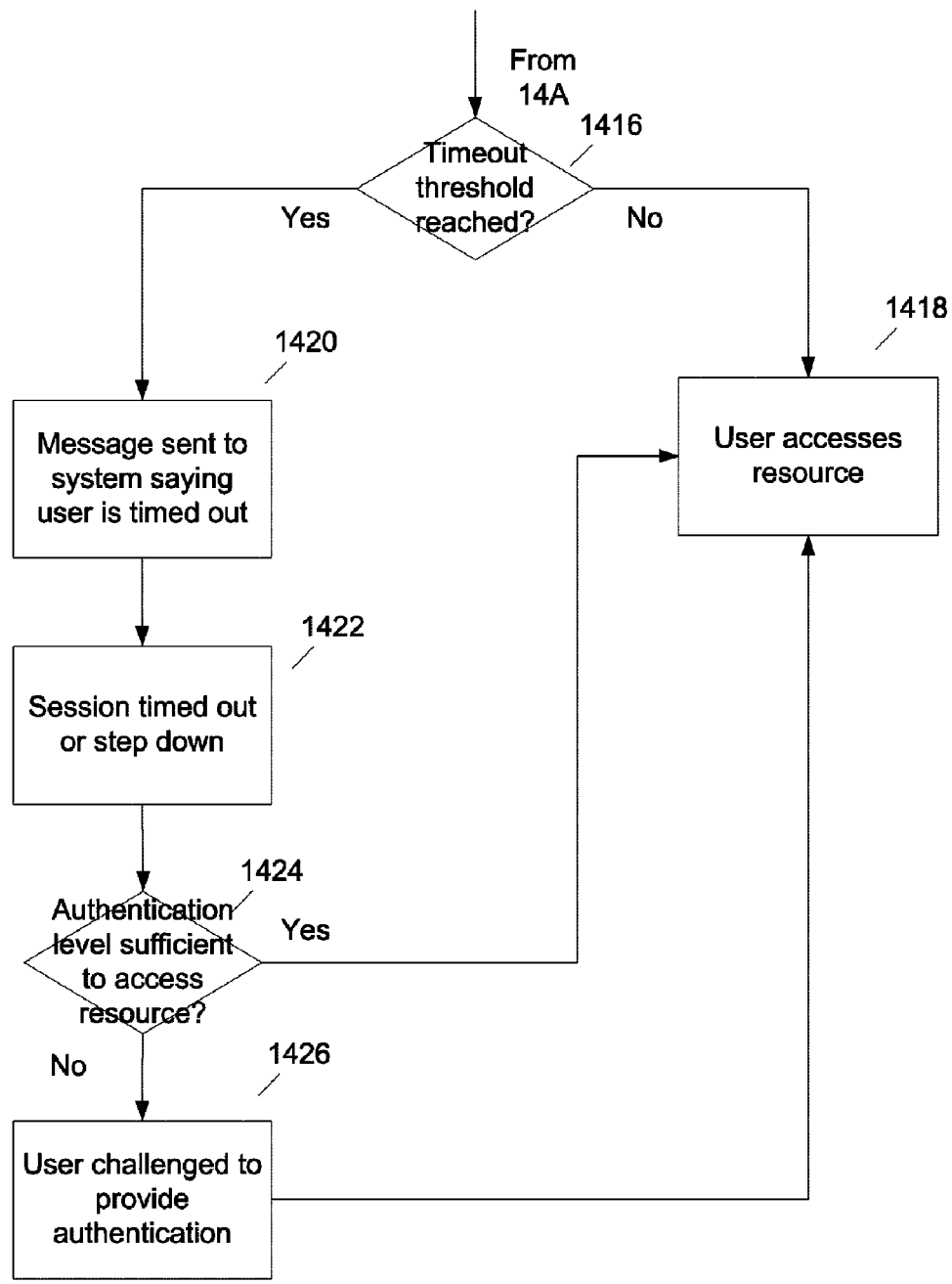
FIG. 14B is a flow diagram showing the rest of the process for dynamic session timeouts based on authentication levels.

FIG. 14B is a flow diagram showing the rest of the process for dynamic session timeouts based on authentication levels. At step 1416, the SSO framework determines if the threshold has been reached. At step 1418, if the threshold has not been reached, the user can access the resource. At step 1420, if the threshold has been reached, a message is sent to the application from the SSO framework notifying it that the time out has been reached.

At step 1422, the application responds by logging the user off, or stepping down the user's authentication level. For example, a user with a high authentication level can be stepped down to a lower authentication level after 5 minutes, and an even lower authentication level after 15 minutes. Timeouts for stepping down from higher authentication levels can be shorter, to provide more security. More generally, timeouts can be based on the user's current authentication level, and the authentication level the user is being stepped down to.

At step 1424, the application uses the SSO framework and determines if the user's current stepped down authentication level is sufficient to access the application. If so, the user is allowed to access the application at step 1418. Otherwise, at step 1426, the user is challenged to provide their authentication information.

Figure 15:
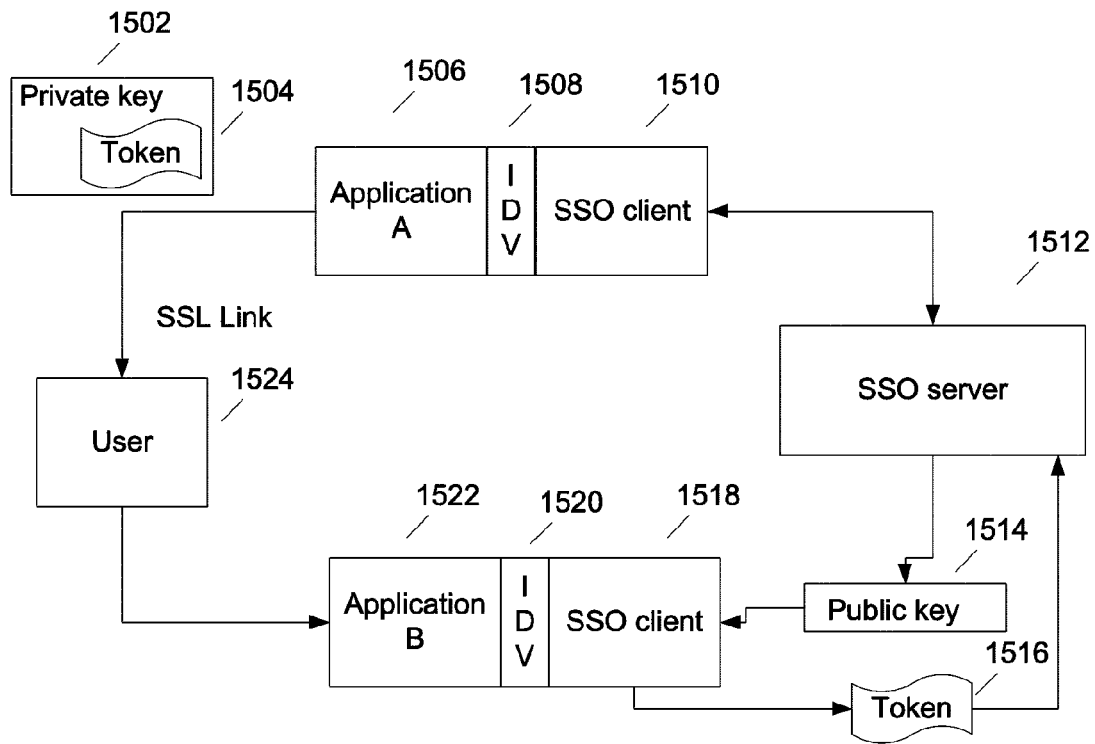
FIG. 15 is a system diagram showing details of an artifact model capable of being used within the SSO system.

FIG. 15 is a system diagram showing details of an artifact model capable of being used within the SSO system. As described above, in the artifact model, a token is passed between the host application and the target application. The token contains an identifier used to access information about the user's SSO session in a central SSO server.

FIG. 15 shows application A 1506 with IDV 1508, and SSO client 1510. Also shown is application B 1522, with IDV 1520, and SSO client 1518. In operation, when a user 1524 accesses application 1506 and links to another application such as 1522, a token is generated by SSO client 1510 using SSO server 1512. The SSO server generates the token and encrypts it with a private key. The token 1504, and the private key 1502 the token is encrypted with, is sent back to the user's client, for example as a cookie to a web browser. This token, and all communication, can be done through an encrypted communication session. For example, communication can be done using an SSL connection. The token 1504, as encrypted with private key 1502, is then sent to application B 1522.

The SSO client 1520 uses the server public key, which may be provided by the SSO server 1512, to decrypt the token 1504. The application 1522 can then send the decrypted token 1516 back to the SSO server 1512, so that the SSO server can verify whether the user can access application 1522 without have to provide any additional authentication information. Alternatively, the token can be encrypted using session based keys, with the token providing a reference to information within the SSO server that can be used by the target application to verify a user and allow them access to the target application.

Figure 16:
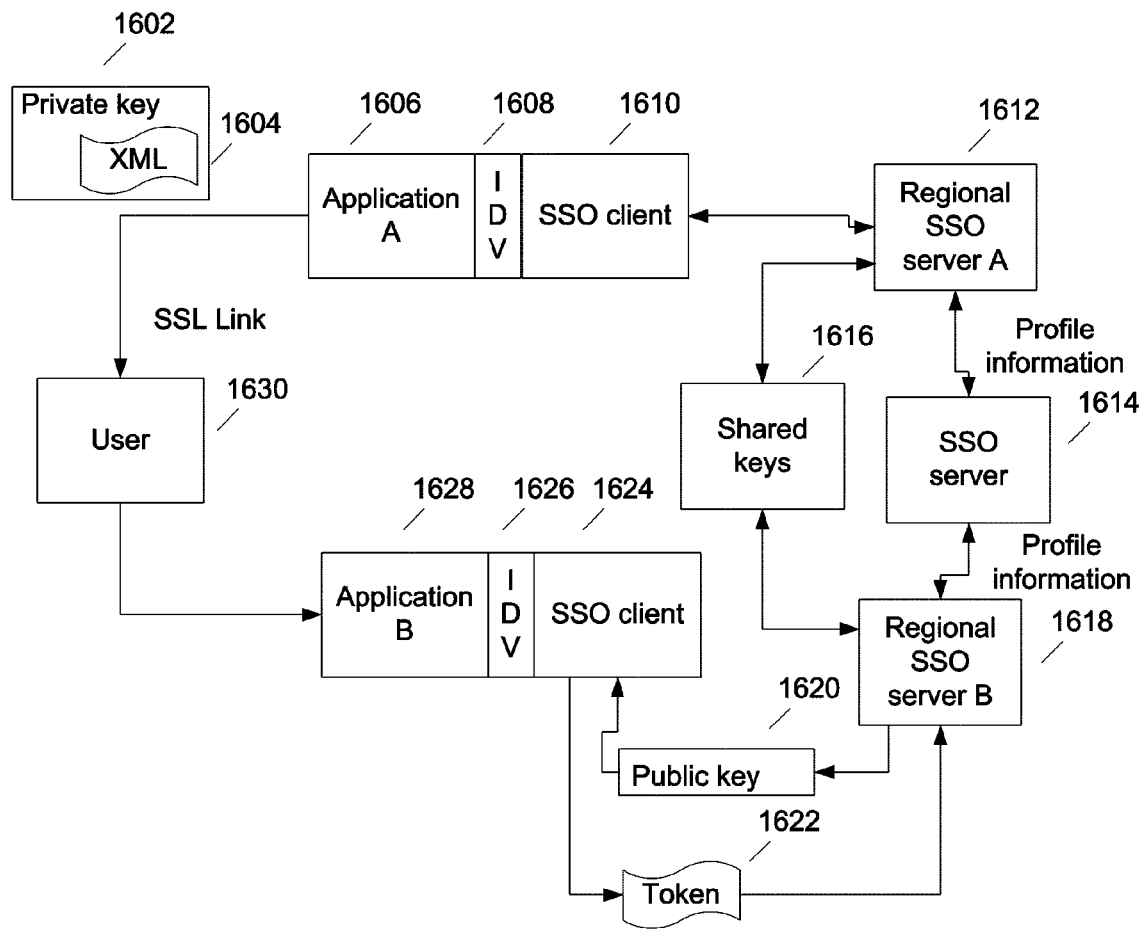
FIG. 16 is a system diagram showing details of an assertion model capable of being used within the SSO system.

FIG. 16 is a system diagram showing details of an assertion model capable of being used within the SSO system. As described above, in an assertion model, information needed to verify the user is contained within the token itself. FIG. 16 is similar to FIG. 15, and shows a primary Application A 1606 with corresponding IDV 1680, and SSO client 1610. FIG. 16 also shows target application B 1628, IDV 1626, and SSO client 1624. In operation, a user accesses application A 1606, and then links to application B 1628. Application A 1606 using IDV 1608, and SSO client 1610, generates a token 1604 for the user that contains the necessary verification information. For example, the token can be an XML file.

The token 1604 can be encrypted by a regional SSO server A 1612 using a private key. The token, as encrypted, is then sent to application B. Application B can decrypt the token using regional server B 1618, and the corresponding public key. Application B can then send the decrypted token to regional SSO server B to verify the user is authorized to access the application. Because profile information is distributed between central SSO server 1614 and the regional SSO servers, the regional SSO servers can verify a user without having to communicate with central SSO server.

To reduce dependence on a central server 1614, one or more regional servers such as regional server A 1612 and regional server B 1618 can be used. These regional servers share a set of keys 1616, which can be stored in hardware security managers.

Figure 17:
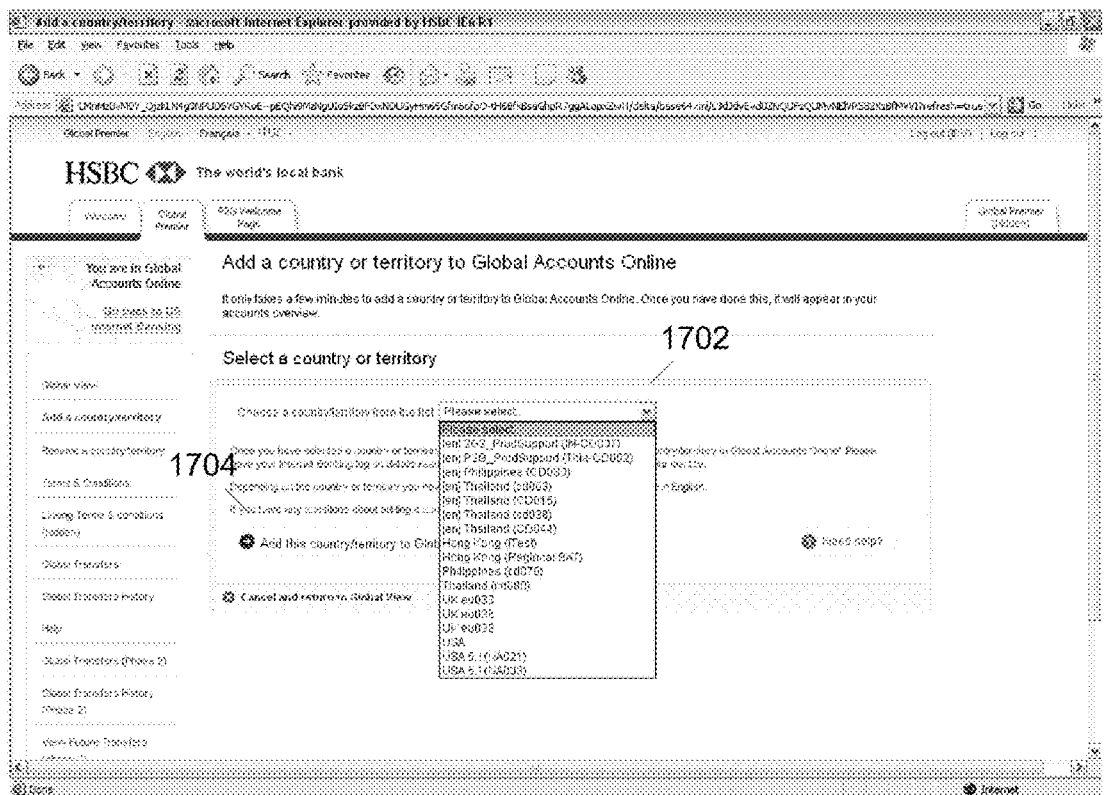
FIG. 17 is a user interface screen showing linking of accounts together.

FIG. 17 is a user interface screen showing the linking of accounts. FIGS. 17-34 generally show a web based fund transfer application in which the single sign on process is used. FIG. 17 shows how a user can link together different banking applications with corresponding different accounts. This way, the user can use the fund transfer application without having to separately authenticate to each different application and corresponding account.

The user can choose the account 1702 they would like to link. In this example, there is a separate application and account for each country. The user can select the account they would like to link using the drop down box. After their selection, they can select the add country link 1704 to confirm their selection and move to the next step of the process.

Figure 18:
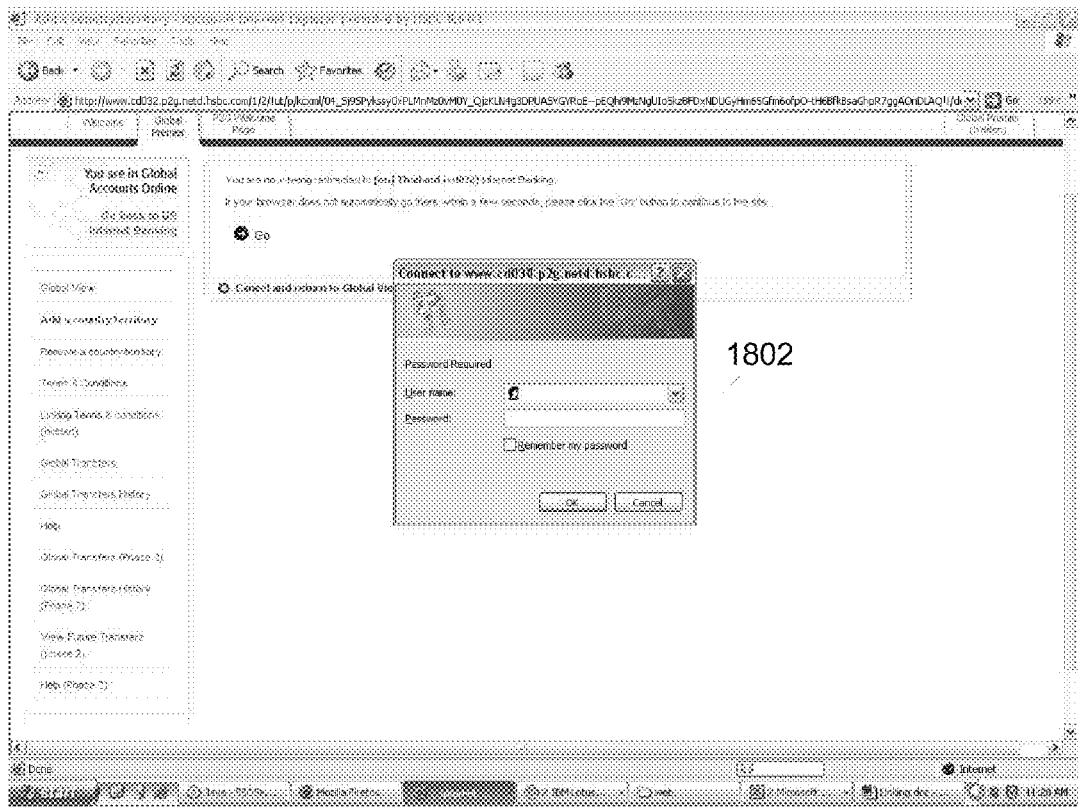
FIG. 18 is a user interface screen showing a user being challenged for authentication information.

FIG. 18 is a user interface screen showing a user being challenged for authentication information. In order to link an account, the user must verify that they can access the account. In this example, the user is asked for a username and password to verify their access. During the linking process, the authentication information requested can be the information that corresponds to the authentication level necessary to access the application normally. For example, for a high security application a user may need to provide biometric identification information when linking the application. Alternatively, the authentication information can be less than or greater than that normally needed to access the application.

Figure 19:
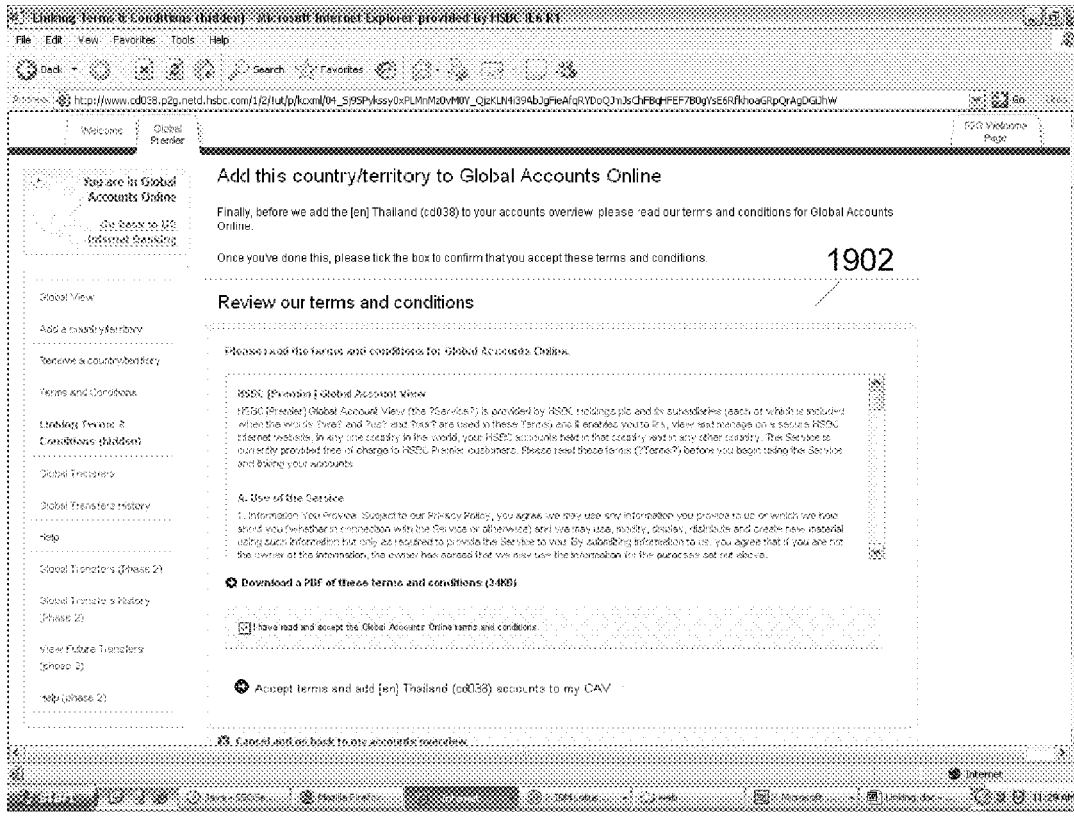
FIG. 19 is a user interface screen showing notification during the linking process.

FIG. 19 is a user interface screen showing notification during the linking process. The information provided in this screen informs the user about the fund transfer application and the linking of accounts.

Figure 20:
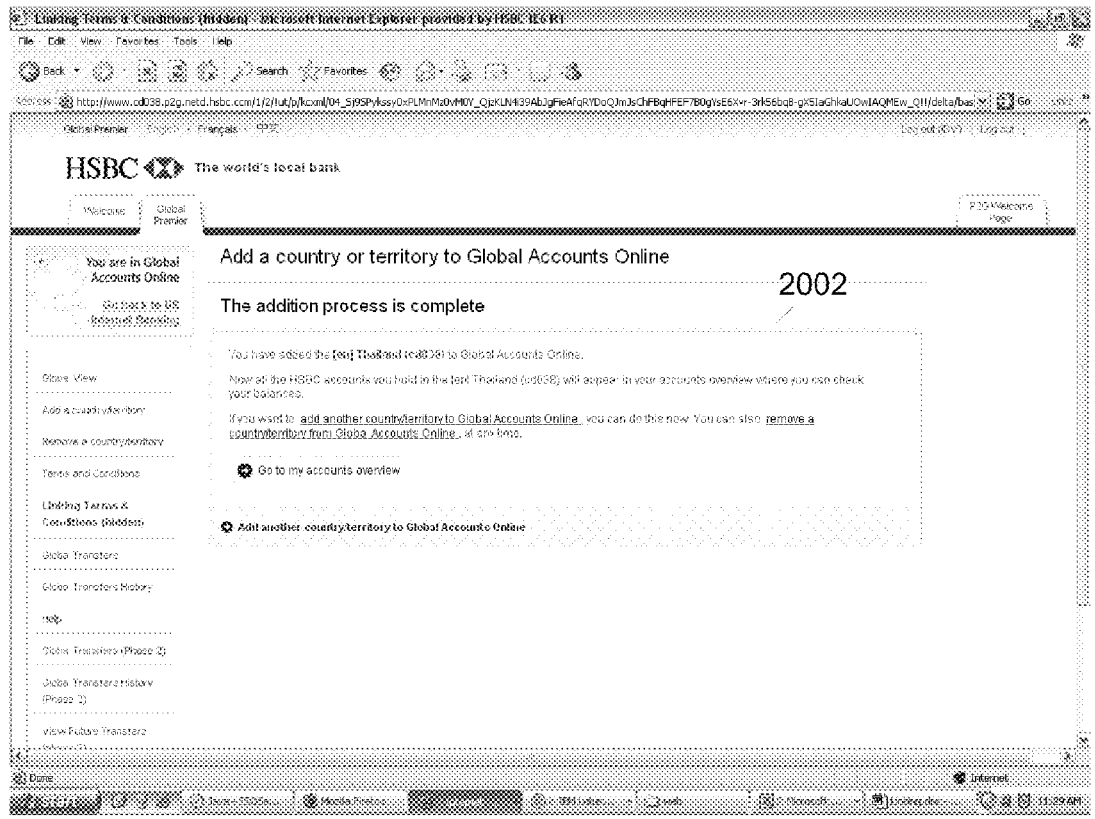
FIG. 20 is a user interface screen showing the results of the linking process.

FIG. 20 is a user interface screen showing the results of the linking process. This screen is a confirmation 2002 to the user that the accounts have been linked. This screen is shown to a user after the fund transfer application receives the authentication information and provides it to the SSO Servers for creation of a link (and a profile if necessary). The SSO server responds with an acknowledgement that the link was successfully created.

Figure 21:
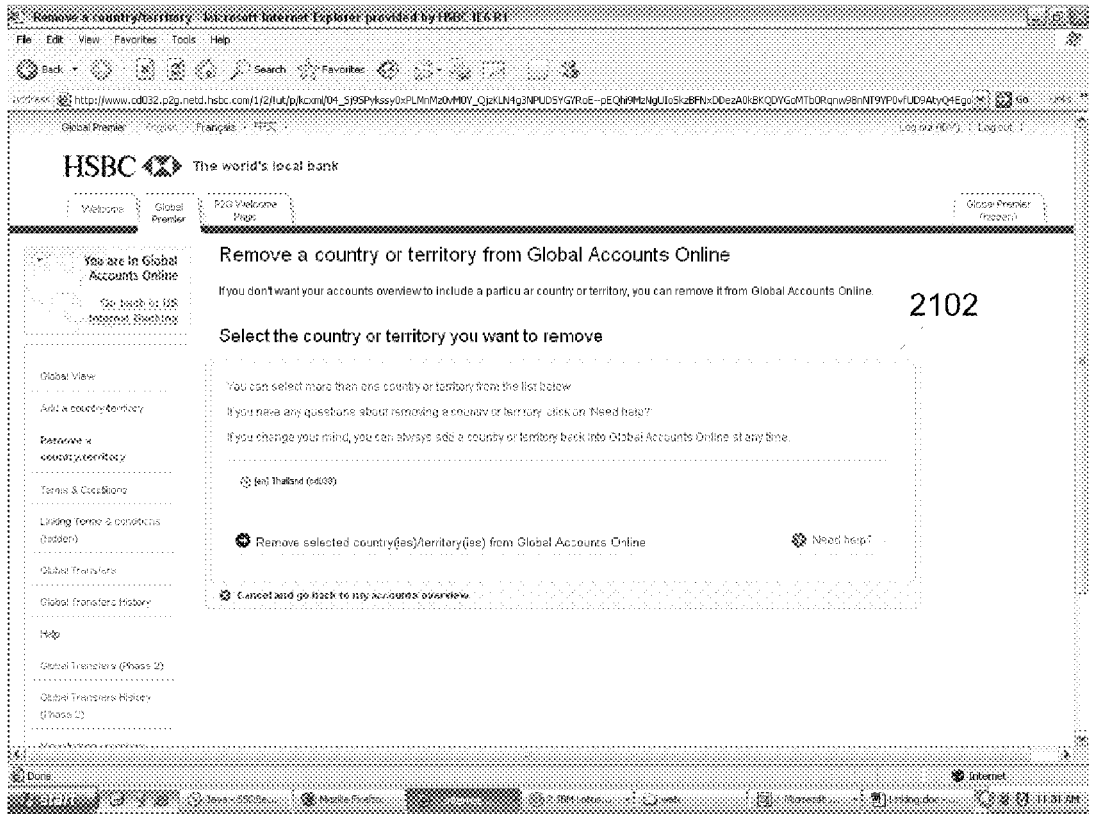
FIG. 21 is a user interface screen showing the removing of a linked account.

FIG. 21 is a user interface screen showing the removing of a linked account. A user can also unlink accounts. A user may do this to increase security, or when deleting or removing one of their accounts. In this screen, the user is shown their linked accounts 2102. From this list the user can select the account to remove.

Figure 22:
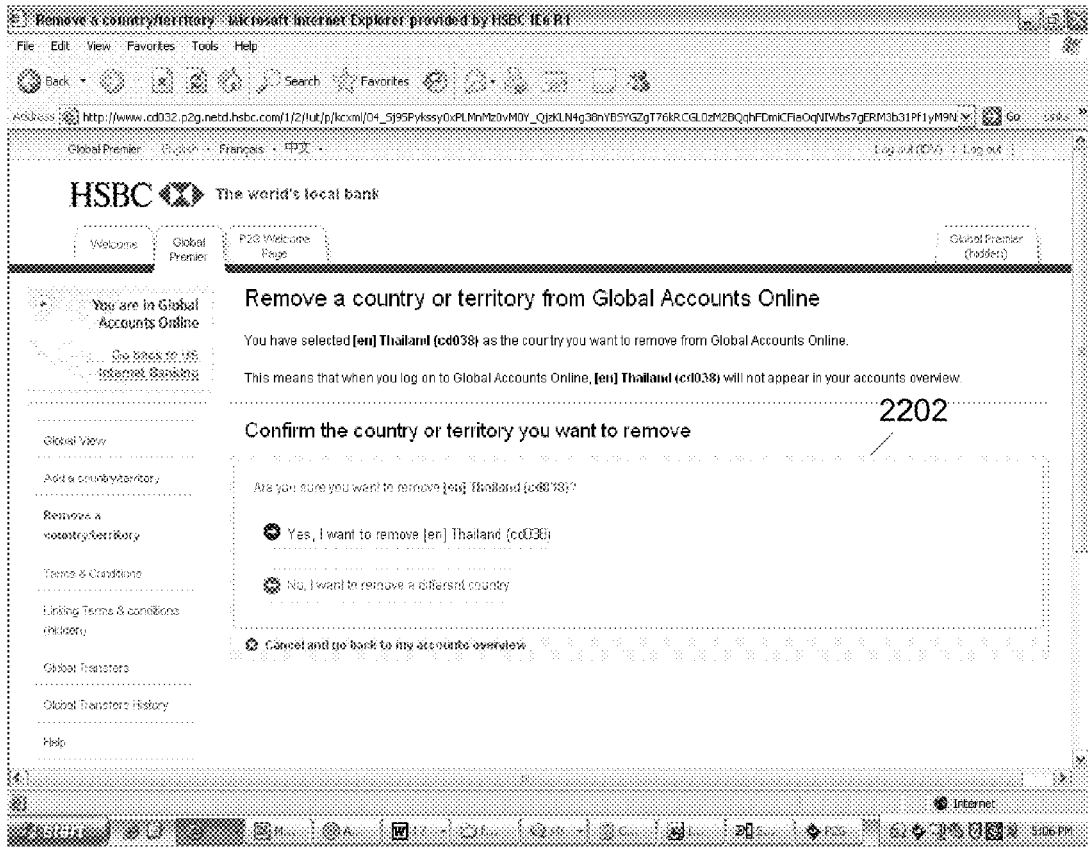
FIG. 22 is a user interface screen showing a request for confirmation of removing of a linked account.

FIG. 22 is a user interface screen showing a request for confirmation of removing a linked account. To confirm the delinking of an account, the fund transfer application displays a confirmation screen. The user can confirm or cancel the operation using the options 2202 that are presented.

Figure 23:
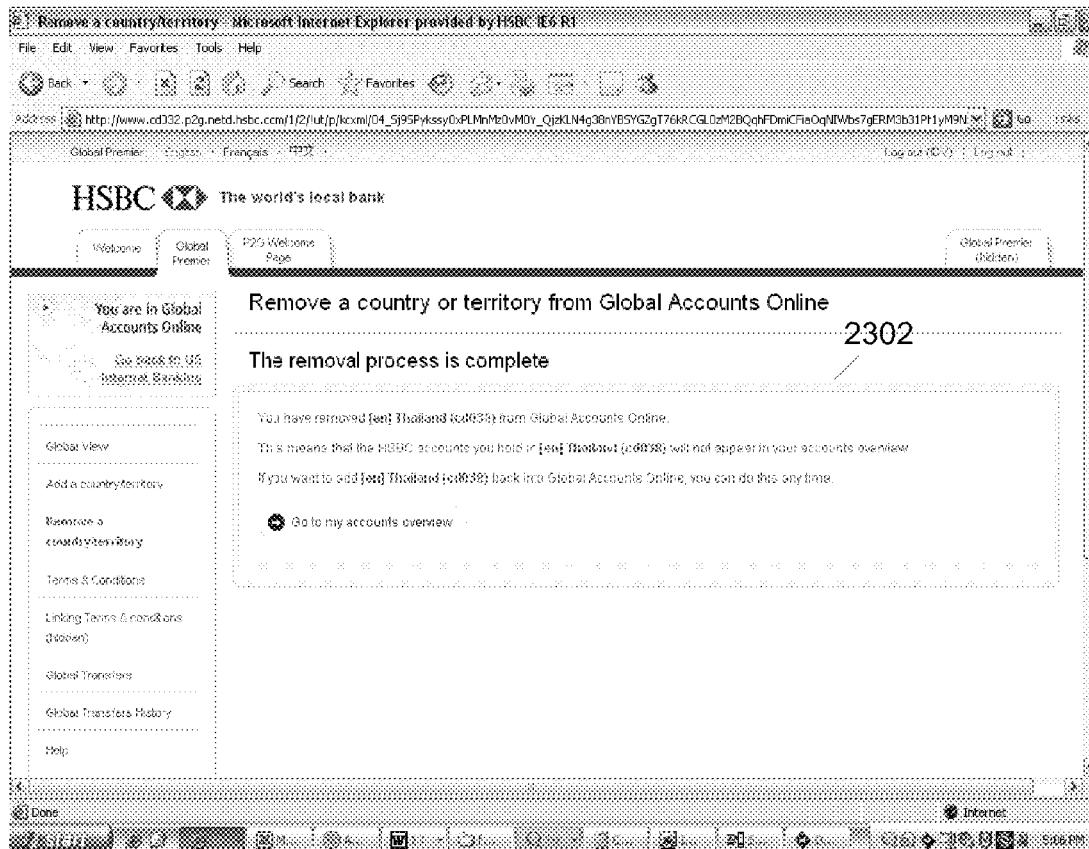
FIG. 23 is a user interface screen showing the results of removing a linked account.

FIG. 23 is a user interface screen showing the results of removing a linked account. The results of the delinking process are shown. The fund transfer application can delink an account by using the SSO framework, and requesting that the accounts be unlinked.

Figure 24:
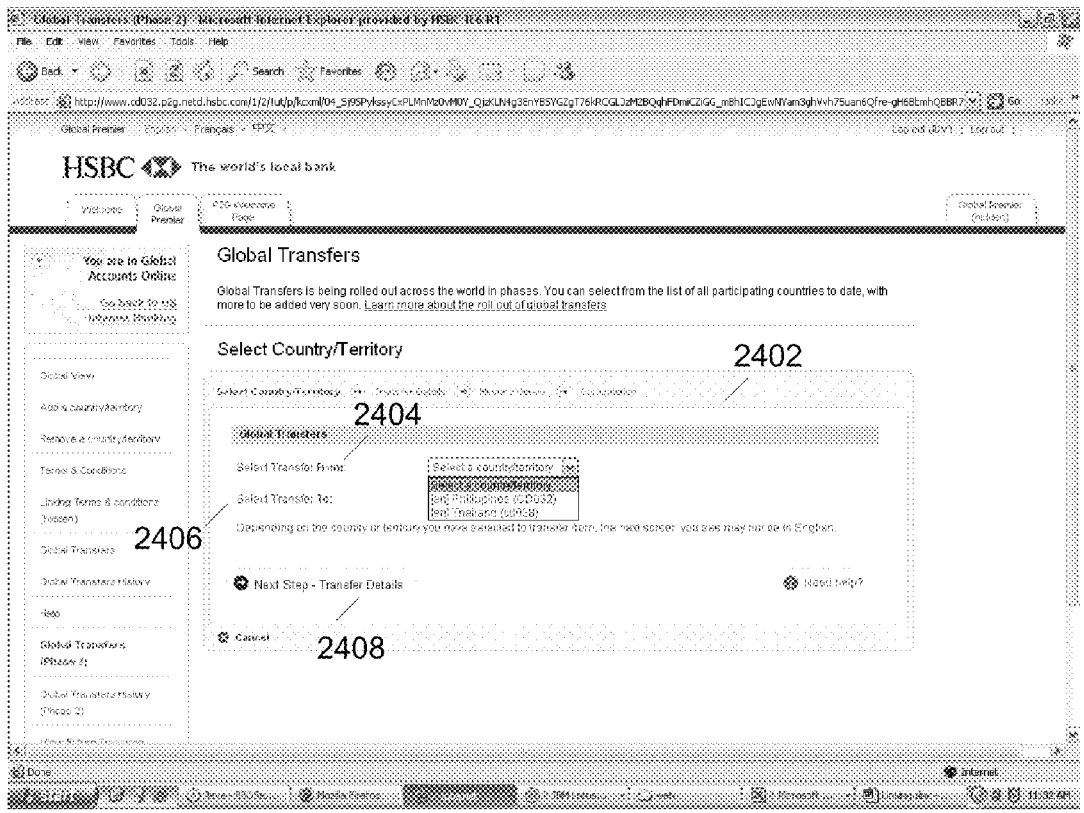
FIG. 24 is a user interface screen showing how to begin a transfer of funds between linked accounts using the single sign on process.

FIG. 24 is a user interface screen showing how to begin a transfer of funds between linked accounts using the single sign on process. To perform a fund transfer, the user first selects from the territories presented 2402 what territory they would like to transfer funds from 2404, and what territory they would like to transfer funds to 2406.

Figure 25:
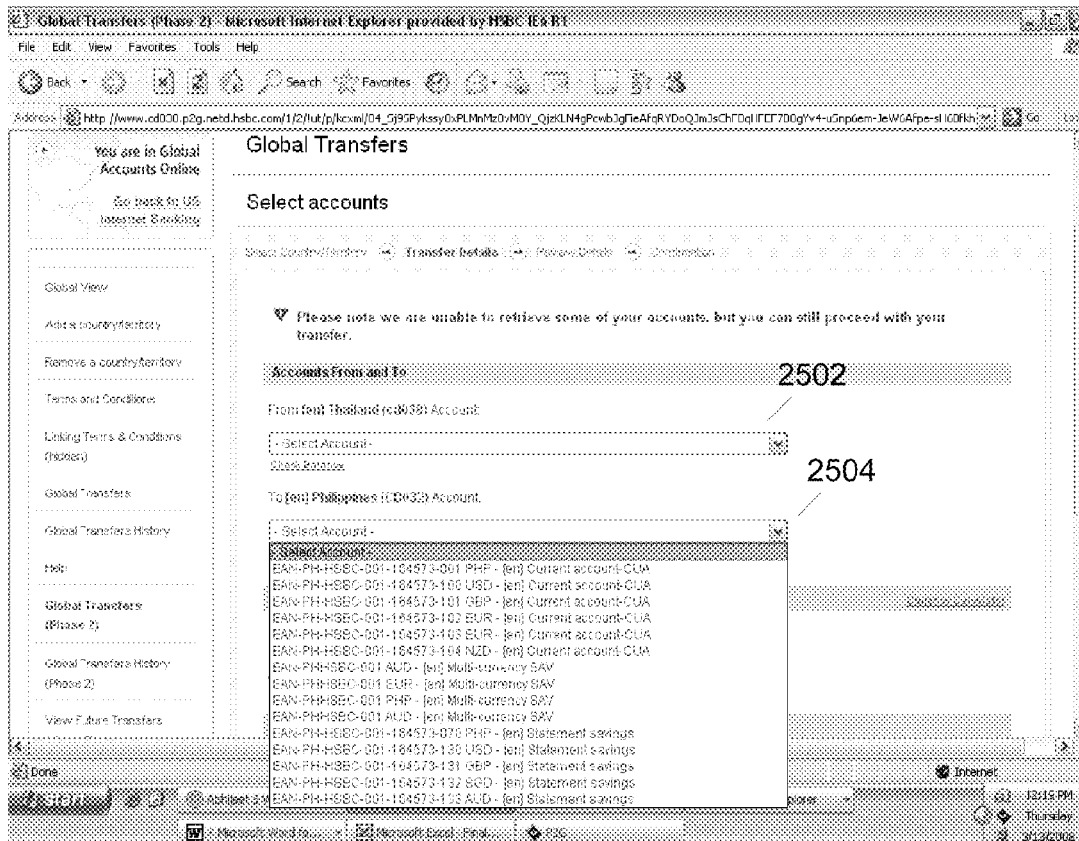
FIG. 25 is a user interface screen showing how to select an account for transfer of funds between linked accounts using the single sign on process.

FIG. 25 is a user interface screen showing how to select an account for transfer of funds between linked accounts using the single sign on process. This screen shows the user selecting the account they would like the transfer funds from 2502, and the account they would like to transfer funds to 2504. The accounts presented can be the previously linked accounts and can also include the user's other accounts. To perform a fund transfer between the user's other accounts that are not linked, may require providing authentication information to complete the fund transfer process. The user can select a link at the bottom of the screen to confirm their selections.

Figure 26:
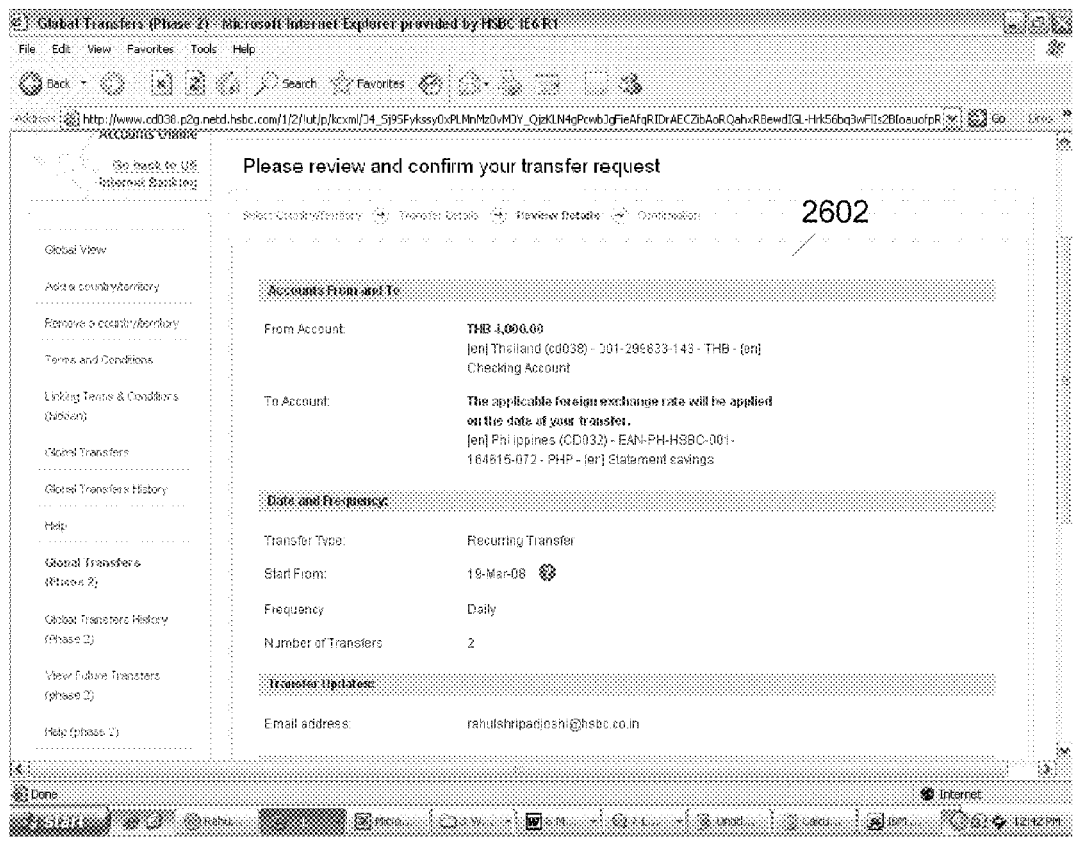
FIG. 26 is a user interface screen showing a confirmation when trying to transfer funds between linked accounts using the single sign on process.

FIG. 26 is a user interface screen showing a confirmation when trying to transfer funds between linked accounts using the single sign on process. The confirmation section 2602 shows the amount of the transfer, and the account the funds are being transferred from and to. The confirmation screen also shows the date and frequency of the transfer, as well as an email address where update notifications can sent. The user can select a link at the bottom of the screen to submit the transfer for processing.

Figure 27:
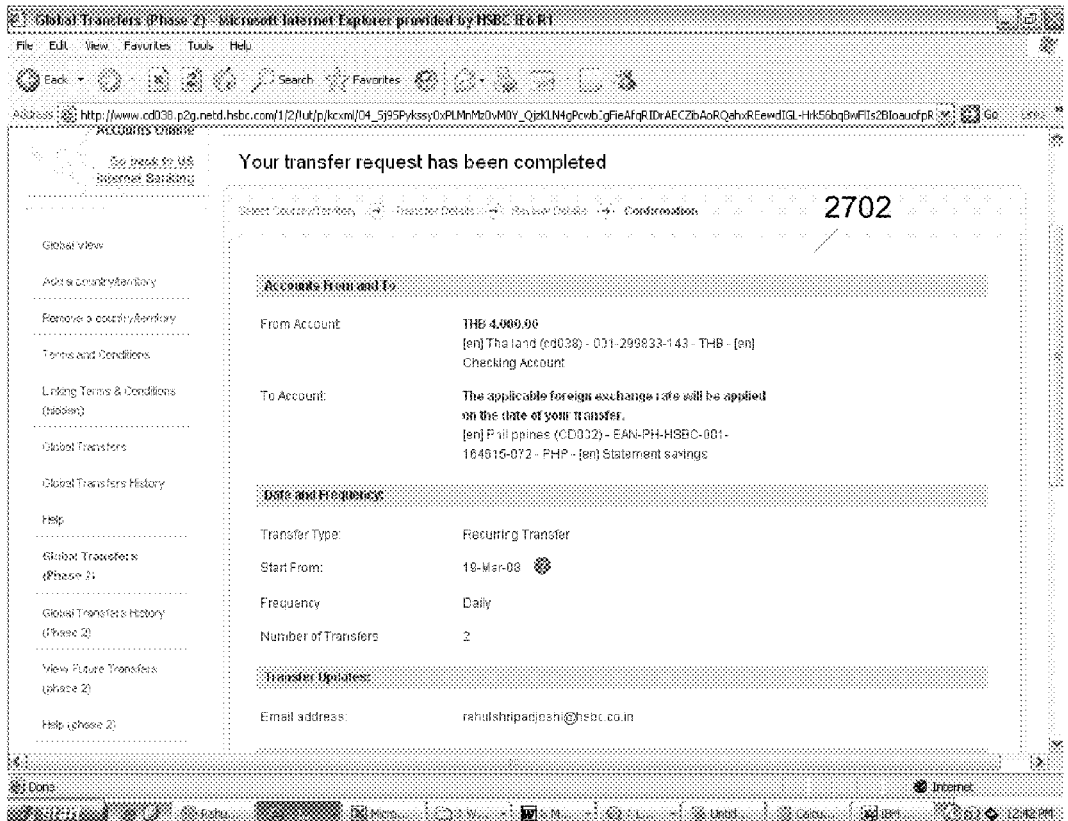
FIG. 27 is a user interface screen showing a notification when trying to transfer funds between linked accounts using the single sign on process.

FIG. 27 is a user interface screen showing a completion notification when trying to transfer funds between linked accounts using the single sign on process. FIG. 27 shows confirmation of a success transfer. In accordance with the single sign on process, the user did not have to provide authentication information for either the account the funds were being transferred from, or the account the funds were being transferred to. Any information needed to authenticate the user to the target application and/or account where the funds were being transferred to can be provided by the user's web browser, for example, in the form of a token submitted along with their confirmation of the fund transfer.

Figure 28:
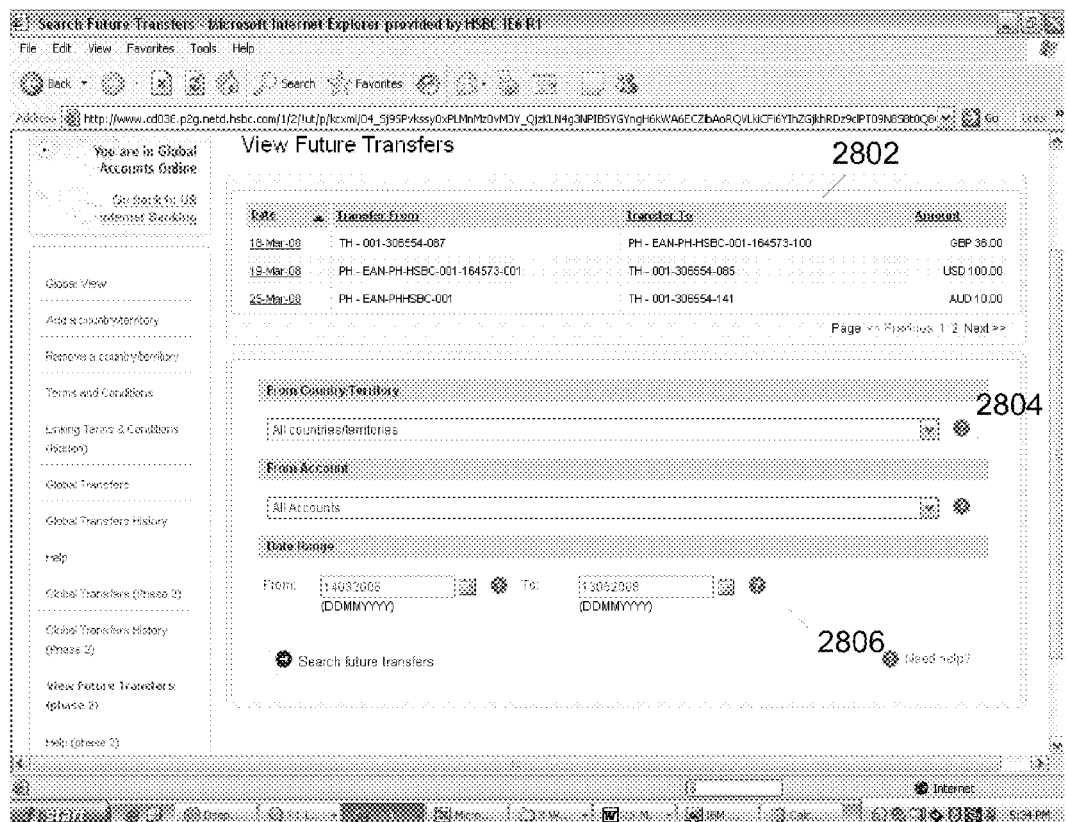
FIG. 28 is a user interface screen showing a history of fund transfers between linked accounts.

FIG. 28 is a user interface screen showing a history of fund transfers between linked accounts. This screen shows future transfers that are pending. This includes information about the pending transfers 2802. The user can also search for transfers using drop down box 2804 and date range 2806.

Figure 29:
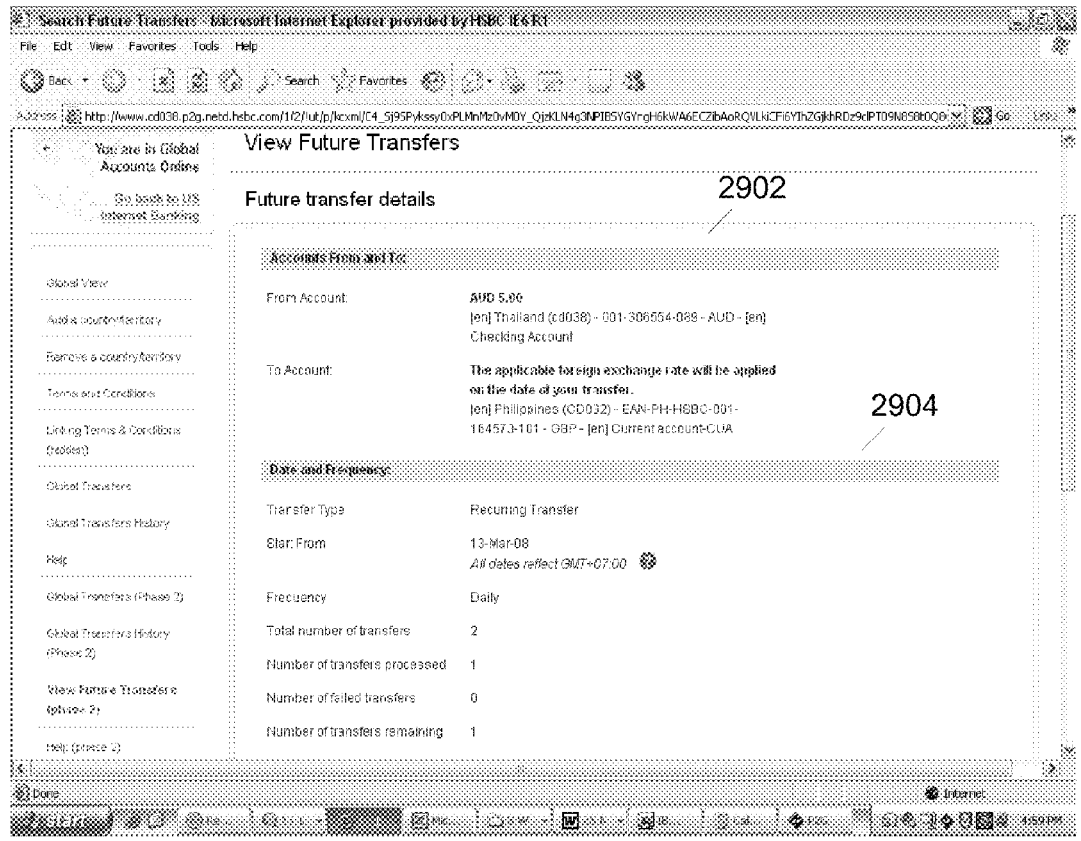
FIG. 29 is a user interface screen showing details of a future transfer between linked accounts.

FIG. 29 is a user interface screen showing details of a future transfer between linked accounts. By selecting one of the future transfers as shown in FIG. 28, the user can view additional information about the transfer, including the accounts from which the transfer is being made from/to 2902, and the date and frequency 2904 of the transfer.

Figure 30:
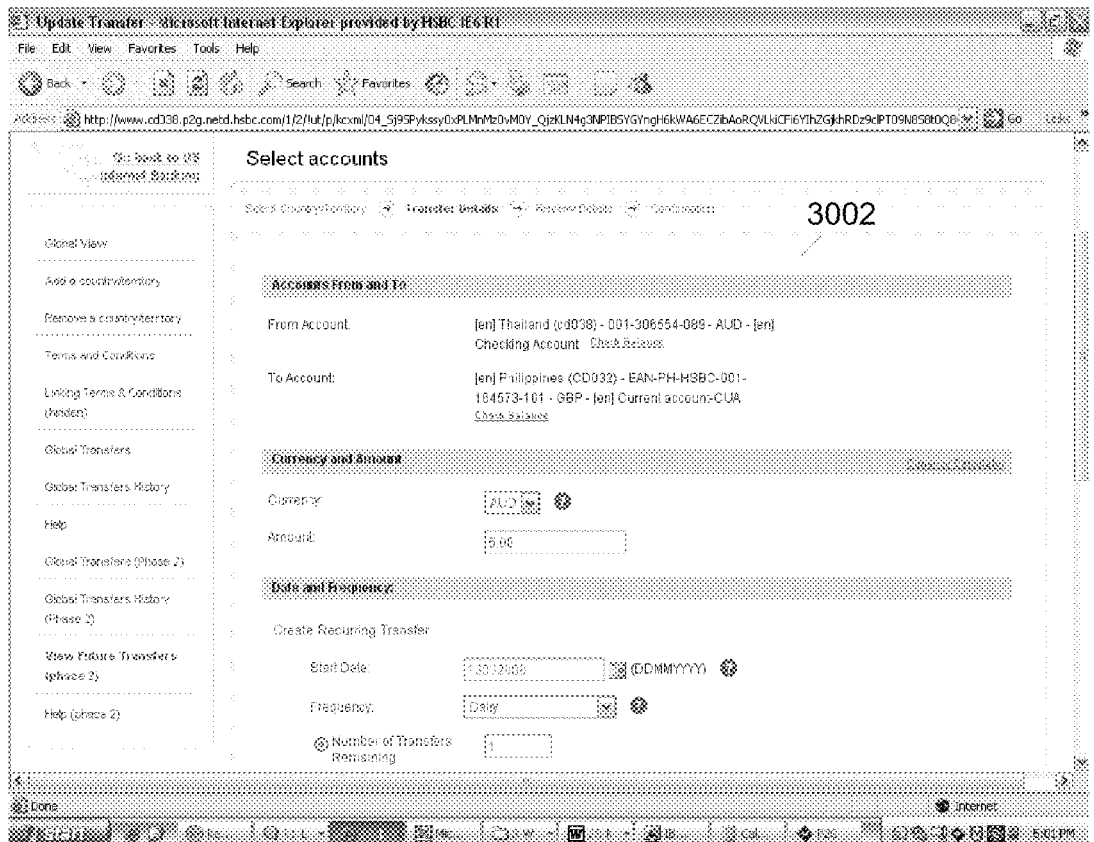
FIG. 30 is a user interface screen showing updating a transfer between linked accounts.

FIG. 30 is a user interface screen showing updating of a transfer between linked accounts. A user can also update a future transfer by selecting it, and then editing one or more details of the transfer.

Figure 31:
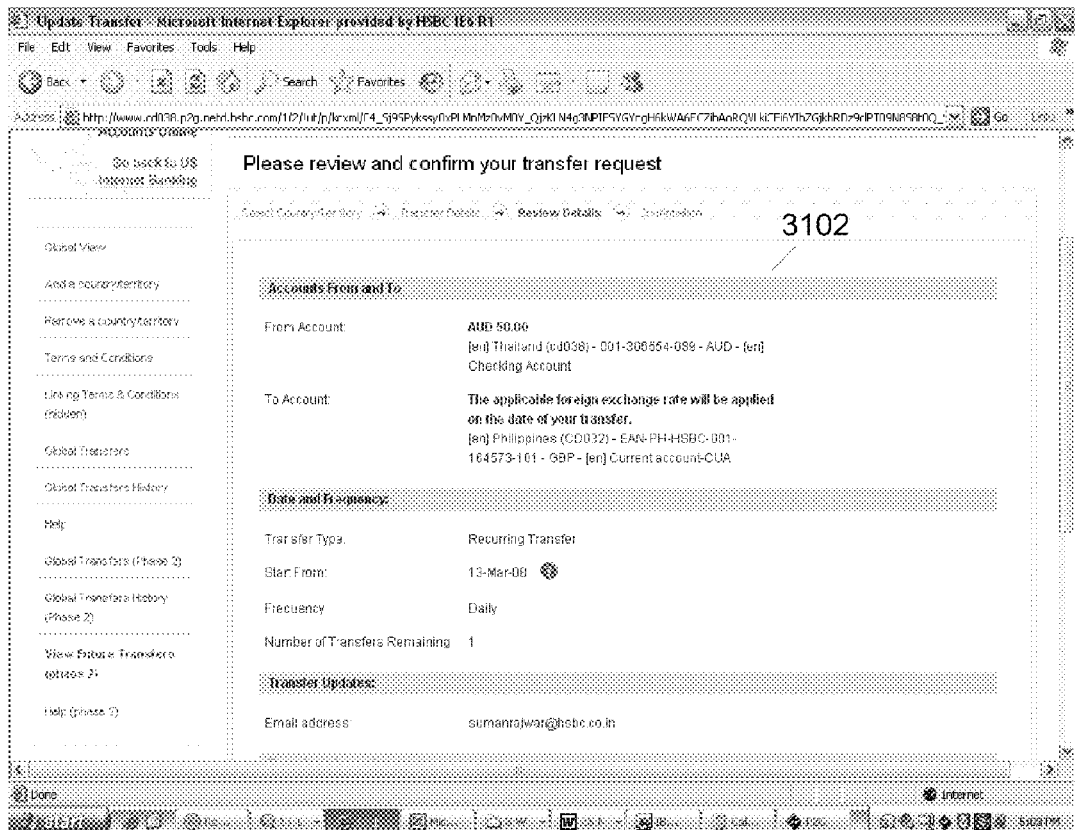
FIG. 31 is a user interface screen showing confirming of an update of a transfer between linked accounts.

FIG. 31 is a user interface screen showing confirmation of an update 3102 to a transfer between linked accounts. The user can confirm the updates by selecting a link at the bottom of the screen.

Figure 32:
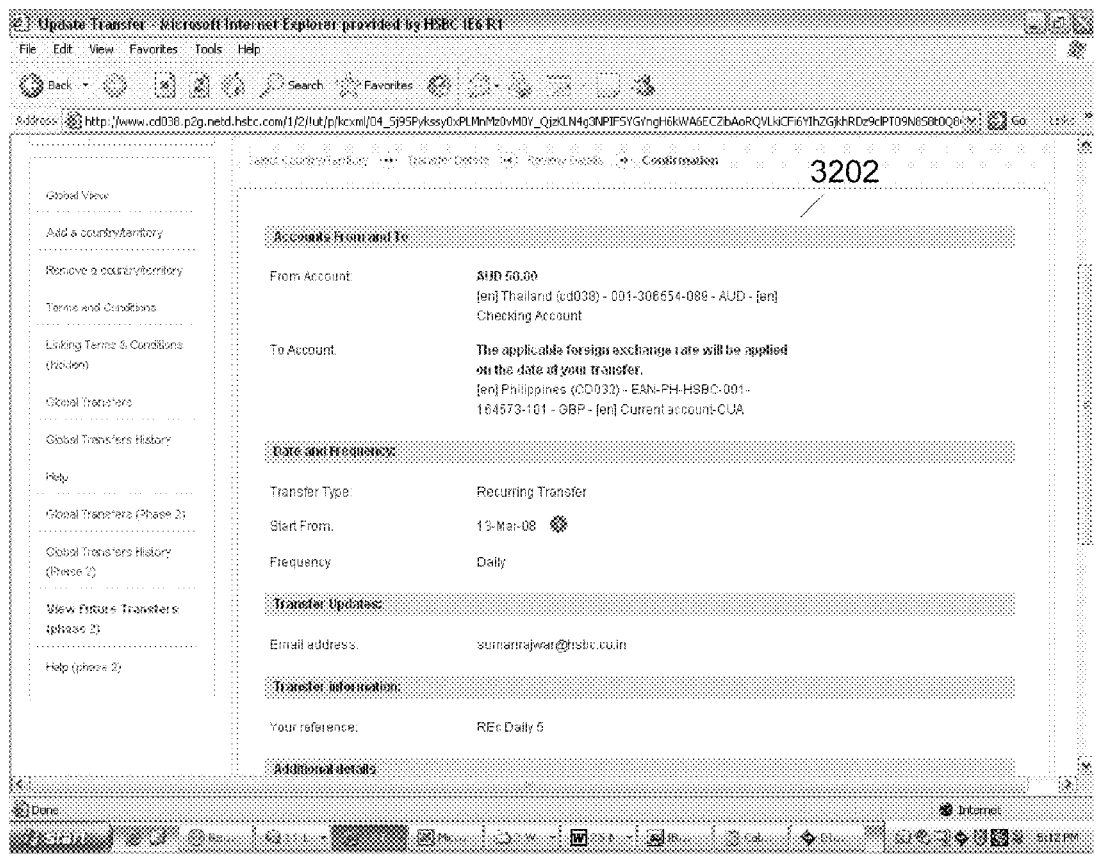
FIG. 32 is a user interface screen showing the updated future transfer between linked accounts.

FIG. 32 is a user interface screen showing the updated future transfer between the linked accounts. This screen shows the final updated fund transfer to the user.

Figure 33:
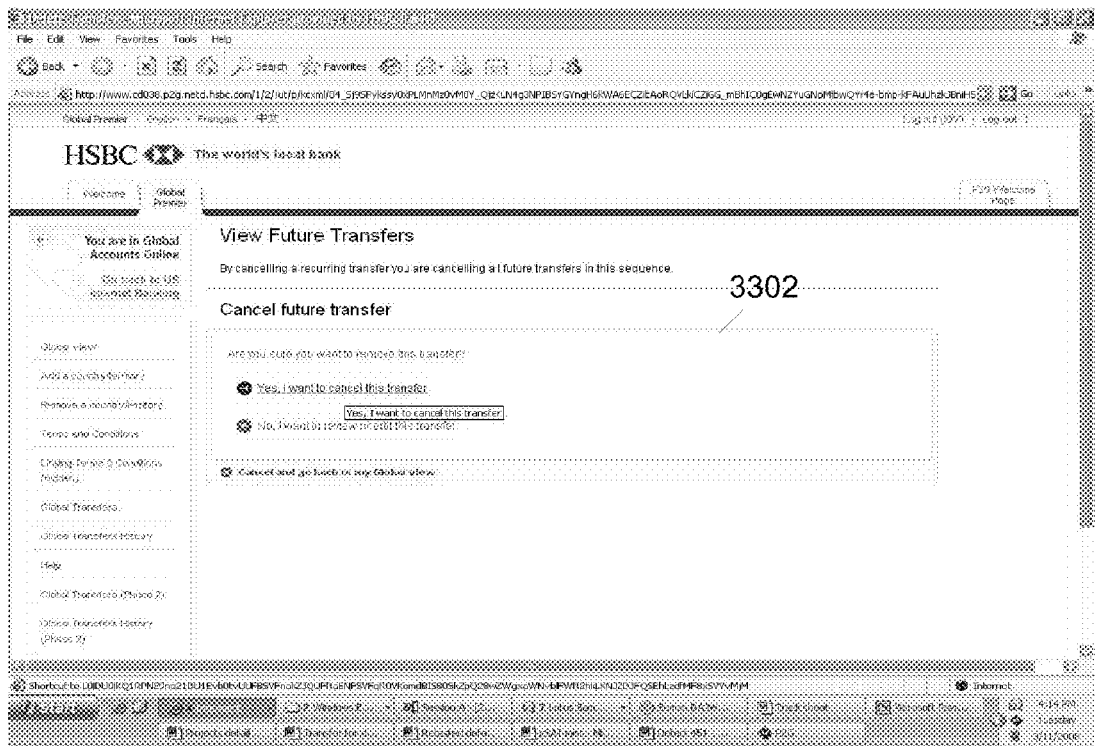
FIG. 33 is a user interface screen showing canceling of a future transfers between linked accounts.

FIG. 33 is a user interface screen showing canceling of a future transfer between linked accounts. This screen allows a user to cancel a future fund transfer. In operation, user selects a transfer using the link, and then cancels the transfer using option 3302.

Figure 34:
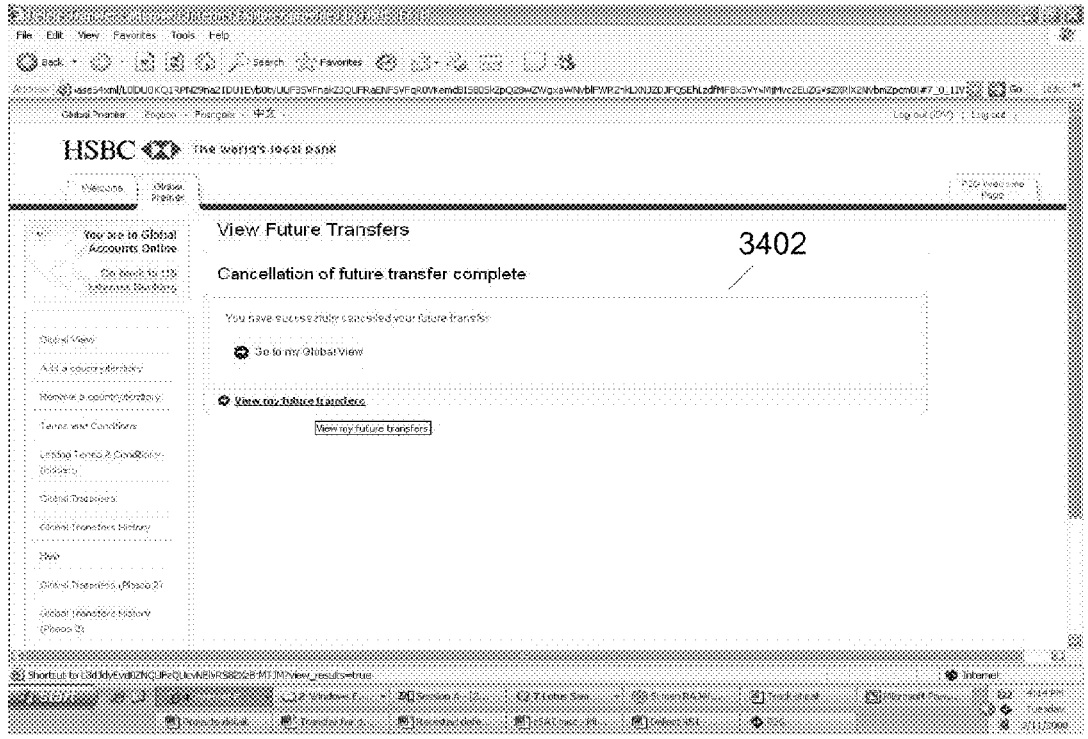
FIG. 34 is a user interface screen showing confirmation of a cancellation of a future transfer between linked accounts.

FIG. 34 is a user interface screen showing the confirmation of a cancellation of a future fund transfer between linked accounts.

Other embodiments, extensions and modifications of the ideas presented above are comprehended and within the reach of one versed in the art upon reviewing the present disclosure. Accordingly, the scope of the present invention in its various aspects should not be limited by the examples and embodiments presented above. The individual aspects of the present invention and the entirety of the invention should be regarded so as to allow for such design modifications and future developments within the scope of the present disclosure. The present invention is limited only by the claims that follow.

What is claimed is:

1. A computer implemented method for automatically providing access to a second application to a user authenticated to a first application, the method comprising:
    (a) receiving from the user authenticated to the first application, using at least one computer system communicating with an electronic network, a data request for access to the second application, wherein the user is authenticated to the first application at a first authentication level;
    (b) processing by a computer server, by retrieving application information stored in a database, the minimum authentication level necessary to access the second application;
    (c) receiving, from the user via the computer network, further authentication data to access the second application, provided in response to a request, wherein the type of the further authentication data required is based on the first authentication level and the minimum authentication level necessary to access the second application; and
    (d) authenticating the user to the second application at the minimum authentication level necessary to access the second application.

2. The method of claim 1, further comprising pre-linking, by the user, the first and second application.

3. The method of claim 1, wherein the user links the second application before accessing it, and wherein linking comprises providing identification and authentication data and creating an entry in a user profile database.

4. The method of claim 3, wherein an entry in the user profile database contains at least one linked application and a username and authentication data associated with the at least one linked application.

5. The method of claim 4, further comprising the user delinking the second application.

6. The method of claim 1, wherein the type of authentication data is at least one of entering a password, responding to challenge questions, and providing biometric information.

7. The method of claim 1, wherein the first authentication level and the minimum authentication level necessary to access the second application are selected from one of four authentication levels.

8. The method of claim 1, wherein the request to access the second application is received from a web browser, and the second application is a web application.

9. The method of claim 1, wherein the request to access the second application is accompanied by a token, and wherein the token contains the user's identification, and wherein the token is used by the second application to retrieve infolination about the user's session.

10. The method of claim 9, further comprising encrypting the token using public key cryptography.

11. The method of claim 10, further comprising at least one encryption key is stored in a hardware security manager coupled to the computer server by a computer network.

12. The method of claim 1, further comprising generating a token when the user requests access to the second application from the first application.

13. The method of claim 12, further comprising the token containing the user's identification, and wherein the token is used by the computer server to retrieve information about the user's session.

14. The method of claim 13, wherein the token contains an identifier and the information necessary to authenticate the user.

15. The method of claim 14, wherein the information is represented using extensible markup language, and wherein the information is encrypted.

16. The method of claim 12, wherein the minimum authentication level necessary to access the second application is determined from a database of application profiles and the user's first authentication level contained in the token.

17. The method of claim 1, wherein the second application is a portlet, and wherein a request to access the portlet is automatically received from a the client application after authenticating the client to the first application.

18. The method of claim 1, further comprising:
receiving a request to log off the user to the first application;
receiving a request to authenticate the user to the first application, wherein the request comprises a different username and authentication data;
receiving from the user, via at least one computer system and an electronic network, a request to access the second application, wherein the user is authenticated to the first application at a first authentication level and with the different username;
logging the user off the second application;
determining by a computer server, and using a database of application information, the minimum authentication level necessary to access the second application with the different user name;
receiving from the user, via the computer network, a further authentication data to access the second application, in response to a request, wherein the type of the further authentication data required is based on the first authentication level and the minimum authentication level necessary to access the second application with the different username; and
authenticating the user to the second application at the minimum authentication level necessary to access the second application.

19. The method of claim 1, wherein the authentication data required is dynamically adapted to the user's current authentication level.

20. The method claim 19, wherein the authentication data is dynamically adapted for the user's current authentication level at each authentication level within an authentication hierarchy.

21. A method for automatically stepping down a user authenticated to an application at a first authentication level, after a period of time, to a lower second authentication level, the method comprising:
(a) a user authenticated to an application at a first authentication level;
(b) receiving, using at least one computer system in communication with an electronic network, after a period of time, a request from a user to access the application;
(c) stepping down, by a computer server, the user's authentication level from the first authentication level to a lower second authentication level, based on predetermined criteria, wherein the computer server updates session information regarding the user's authentication level, and wherein the predetermined criteria is the period of the time and the first authentication level; and
(d) receiving, through the computer network, further authentication data from the user, wherein the further authentication data is receiving in response to a request, and wherein the type of authentication requested from the user is based on the lower authentication level and the authentication necessary to access the application.

22. The method of claim 21, wherein the stepping down of step (c) is also based on the lower authentication level.

23. The method of claim 21, wherein the type of authentication data is at least one of entering a password, responding to challenge questions, and providing biometric information.

24. The method of claim 21 wherein the request from the user to access the application is received from a web browser, and wherein the application is a web application.

25. The method of claim 21, further comprising:
(e) stepping down, after a second period of time, the user's lower authentication level to a still lower authentication level, based on the second period of the time and the lower authentication level.

26. The method of claim 21, wherein stepping down, by a computer server, the user's authentication level from the first authentication level to a lower authentication level comprises receiving a request to log off the user from the application.

27. The method of claim 21, further comprising:
a user authenticated to a second application at a first authentication level;
stepping down with respect to the second application, by a computer server, the user's authentication level from the first authentication level to a lower authentication level, based on the period of the time and the first authentication level.

28. The method of claim 27 wherein stepping down, by a computer server, the user's authentication level from the first authentication level to a lower authentication level, based on the period of the time and the first authentication level is done by receiving a message from the application through a message passing interface.

29. The method of claim 21, wherein the type of authentication requested is dynamically adapted to the user's current authentication level.

30. The method of claim 29, wherein the type of authentication requested is dynamically adapted for user's current authentication level at each authentication level within an authentication hierarchy.

31. A computer-readable storage device containing instructions for automatically providing access to a second application to a user authenticated to a first application, the method comprising:
(a) receiving from the user authenticated to the first application, via at least one computer system and an electronic network, a request to access the second application, wherein the user is authenticated to the first application at a first authentication level;
(b) determining by a computer server, and using a database of application information, the minimum authentication level necessary to access the second application;
(c) transmitting to the user via the computer network a request for further authentication to access the second application, based on the first authentication level and the minimum authentication level necessary to access the second application, wherein a type of the further authentication required is abased on the first authentication level and the minimum authentication level necessary to access the second application;
(d) receiving, via the least one computer system and electronic network, the further authentication from the user;
(e) authenticating the user to the second application at the minimum authentication level necessary to access the second application; and
(f) providing the requested access to the second application.

32. A computer implemented system for automatically providing access to a second application to a user authenticated to a first application, the system comprising:
a front end server receiving from the user authenticated to the first application, using at least one computer system communicating with an electronic network, a data request for access to the second application, wherein the user is authenticated to the first application at a first authentication level;

a computer server retrieving application information stored in a database, the minimum authentication level necessary to access the second application;

the front end server receiving from the user, via the computer network, further authentication data to access the second application, provided in response to a request, wherein the type of the further authentication data required is based on the first authentication level and the minimum authentication level necessary to access the second application; and authenticating the user to the second application at the minimum authentication level necessary to access the second application.

33. The system of claim 32, further comprising pre-linking, by the user, the first and second application.

34. The system of claim 32, wherein the user links the second application before accessing it, and wherein linking comprises providing identification and authentication data and creating an entry in a user profile database.

35. The system of claim 32, wherein the first authentication level and the minimum authentication level necessary to access the second application are selected from one of four authentication levels.

36. The system of claim 32, wherein the request to access the second application is accompanied by a token, and wherein the token contains the user's identification, and wherein the token is used by the second application to retrieve information about the user's session.

37. The system of claim 32, further comprising generating a token when the user requests access to the second application from the first application, and wherein the token is used by the computer server to retrieve information about the user's session.

38. The system of claim 32, further comprising:

receiving a request to log off the user to the first application;

receiving a request to authenticate the user to the first application, wherein the request comprises a different username and authentication data;

receiving from the user, via at least one computer system and an electronic network, a request to access the second application, wherein the user is authenticated to the first application at a first authentication level and with the different username;

logging the user off the second application;

determining by a computer server, and using a database of application information, the minimum authentication level necessary to access the second application with the different user name;

receiving from the user, via the computer network, a further authentication data to access the second application, in response to a request, wherein the type of the further authentication data required is based on the first authentication level and the minimum authentication level necessary to access the second application with the different username; and authenticating the user to the second application at the minimum authentication level necessary to access the second application.

39. The system of claim 32, wherein the authentication data required is dynamically adapted to the user's current authentication level.

40. The system claim 39, wherein the authentication data is dynamically adapted for the user's current authentication level at each authentication level within an authentication hierarchy.

41. A system for automatically stepping down a user authenticated to an application at a first authentication level, after a period of time, to a lower second authentication level, the system comprising:

a computer system, in communication with an electronic network, receiving after a period of time, a request from a user to access the application, wherein the user is authenticated to the application at a first authentication level;

a computer server stepping down the user's authentication level from the first authentication level to a lower second authentication level, based on predetermined criteria, wherein the computer server updates session information regarding the user's authentication level, and wherein the predetermined criteria is the period of the time and the first authentication level; and receiving, through the computer network, further authentication data from the user, wherein the further authentication data is receiving in response to a request, and wherein the type of authentication requested from the user is based on the lower authentication level and the authentication necessary to access the application.

42. The system of claim 41, wherein the stepping down of step (c) is also based on the lower authentication level.

43. The system of claim 41, further comprising:

a user authenticated to a second application at a first authentication level;

stepping down with respect to the second application, by a computer server, the user's authentication level from the first authentication level to a lower authentication level, based on the period of the time and the first authentication level.

44. The system of claim 41, wherein the type of authentication requested is dynamically adapted to the user's current authentication level.

45. The method of claim 44, wherein the type of authentication requested is dynamically adapted for user's current authentication level at each authentication level within an authentication hierarchy.

* * * * *